United States Patent
Joshi et al.

(10) Patent No.: US 11,557,105 B2
(45) Date of Patent: Jan. 17, 2023

(54) MANAGING REAL WORLD AND VIRTUAL MOTION

(71) Applicant: VALORBEC SOCIETE EN COMMANDITE, Quebec (CA)

(72) Inventors: Yashas Joshi, Montreal (CA); Charalambos Poullis, Beaconsfield (CA)

(73) Assignee: Concordia University, Montreal (CA)

( * ) Notice: Subject to any disclaimer, the term of this patent is extended or adjusted under 35 U.S.C. 154(b) by 0 days.

(21) Appl. No.: 17/467,844

(22) Filed: Sep. 7, 2021

(65) Prior Publication Data
US 2022/0084301 A1    Mar. 17, 2022

Related U.S. Application Data

(60) Provisional application No. 63/079,089, filed on Sep. 16, 2020.

(51) Int. Cl.
*G06T 19/20* (2011.01)
*G06T 19/00* (2011.01)
*G06T 15/20* (2011.01)
*G06F 3/01* (2006.01)

(52) U.S. Cl.
CPC .............. *G06T 19/20* (2013.01); *G06F 3/013* (2013.01); *G06T 15/20* (2013.01); *G06T 19/006* (2013.01)

(58) Field of Classification Search
CPC ....... G06T 19/20; G06T 15/20; G06T 19/006; G06F 3/013; G06F 2203/012; G06F 3/011
See application file for complete search history.

(56) References Cited

U.S. PATENT DOCUMENTS

| | | | |
|---|---|---|---|
| 2018/0165881 A1* | 6/2018 | Pohl | G06F 3/013 |
| 2019/0012824 A1* | 1/2019 | Sun | G06F 3/011 |
| 2021/0373657 A1* | 12/2021 | Connor | G02B 27/017 |

OTHER PUBLICATIONS

Bolte et al. "Subliminal reorientation and repositioning in immersive virtual environments using saccadic suppression." IEEE Transactions of Visualization and Computer Graphics, 21(4):545-552, 2015.
Langbehn et al. "Subliminal re-orientation and re-positioning in virtual reality during eye blinks." SUI '16, pp. 213-213, 2016.
(Continued)

*Primary Examiner* — Chong Wu
(74) *Attorney, Agent, or Firm* — Rosenberg, Klein & Lee

(57) ABSTRACT

Navigation of a virtual environment (VE) can mean navigating a VE that is spatially larger than the available Physical Tracked Space (PTS). Accordingly, the concept of redirected walking was introduced in order to provide a more natural way of navigating a VE, albeit with many restrictions on the shape and size of the physical and virtual spaces. However, prior art techniques have limitations such as negatively impacting the sense of immersion of the user, motion sickness, or forcing the user to look away by stimulating major saccades. Accordingly, the inventors have established a novel technique which overcomes these limitations. The technique is based on the psychological phenomenon of inattentional blindness allowing for re-directed walking without requiring the triggering major saccades in the users, complex expensive systems, etc.

14 Claims, 11 Drawing Sheets

(56) References Cited

OTHER PUBLICATIONS

Langbehn et al. "In the blink of an eye—leveraging blink induced suppression for imperceptible position and orientation redirectionin virtual reality." ACM Transactions on Graphics, 37:1-11, 2018.
Patney et al. "Perceptually-based foveated virtual reality." ACM SIGGRAPH 2016 Emerging Technologies, SIGGRAPH '16, p. 17:1-17:2. ACM, New York, NY, USA, 2016.
Razzaque et al. "Redirected walking." Proceedings of Eurographics, 9:105-106, 2001.
Stengel et al. "Adaptive Image-Space Sampling for Gaze-Contingent Real-time Rendering." Computer Graphics Forum, 2016. doi: 10.1111/cgf.12956.
Suma et al. "Leveraging change blindness for redirection in virtual environments." 2011 IEEE Virtual Reality Conference, pp. 159-166. IEEE, 2011.
Sun et al. "Towards virtual reality infinite walking: dynamic saccadic redirection." ACM Transactions on Graphics (TOG), 37(4):67, 2018.

\* cited by examiner

MANAGING REAL WORLD AND VIRTUAL MOTION

CROSS-REFERENCE TO RELATED APPLICATIONS

This patent application claims the benefit of priority from U.S. Provisional Patent Application 63/079,089 filed Sep. 16, 2020; the entire contents of which are incorporated herein by reference.

FIELD OF THE INVENTION

This patent application relates to virtual reality and more particularly to locomotion within virtual reality environments where redirected walking allows a user to navigate a virtual environment spatially larger than the available physical space.

BACKGROUND OF THE INVENTION

Since the early days of virtual reality researchers have investigated ways of users navigating virtual environments (VEs) that are spatially larger than the available Physical Tracked Space (PTS). A number of locomotion techniques relying on pointing devices or walking in-place were proposed which have since become customary in VE applications. However, users find these methods cumbersome and unnatural. The concept of redirected walking was introduced about 20 years ago in order to provide a more natural way of navigating VEs, albeit with many restrictions on the shape and size of the physical and virtual spaces.

A number of approaches have since been proposed for implementing redirected walking based upon hardware or software techniques. Hardware-based techniques such as omni-directional treadmills, the VirtuSphere, etc. are not only expensive solutions to this problem but also fail to provide inertial force feedback equivalent to natural walking. In contrast, software-based techniques are more cost effective and typically involve applying perceptually subtle rotations to the VE causing the user to unknowingly change their walking direction. Applying these rotations to the VE, however subtle, can negatively impact the sense of immersion of the user. This arises as these techniques either employ warping which introduces visual artifacts and distortions in the VE or even simulation sickness, or rely on forcing the user to look away by stimulating major saccades in order to update the environment during the subsequent rapid eye movement resulting from the stimulated major saccades.

Accordingly, it would be beneficial to provide a method of redirected walking for users exploiting virtual reality (VR) or a VE allowing virtual distances and spaces to be traversed which are larger than the available physical space to the user. The inventors have therefore established a novel technique based on the psychological phenomenon of inattentional blindness without requiring the triggering major saccades in the users, complex expensive systems, etc.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to virtual reality and more particularly to locomotion within virtual reality environments where redirected walking allows a user to navigate a virtual environment spatially larger than the available physical space.

In accordance with an embodiment of the invention there is provided a method comprising rendering to the user a sequence of images relating wherein each image comprises:
  a foveal region representing a predetermined portion of a first field of view of the user at a current location of the user with a first direction having a first predetermined geometry and second predetermined dimensions;
  a non-foveal region representing a predetermined portion of a second field of view of the user at the current location with a second direction having a second predetermined geometry and second predetermined dimensions; and
  a transition region having a predetermined third predetermined geometry and third predetermined dimensions; wherein
in a first image of the sequence of images the first direction and second direction are the same;
in a second image of the sequence of images the second direction is offset relative to the first direction by a predetermined angular offset;
in a third image of the sequence of images the first direction is set to the second direction in the second image of the sequence of images such that the first direction and second direction are the same but are now offset from the original first direction in the first image of the sequence of images by the predetermined angular offset;
the transition region blends from the foveal region to the non-foveal region according to a predetermined function; and
transitioning from the first image of the sequence of images to the second image of the sequence of images and the second image of the sequence of images to the third image of the sequence of images is established in dependence upon determining a predetermined natural event with respect to an eye of the user.

In accordance with an embodiment of the invention there is provided a system comprising:
a display for rendering content to a user;
an eye tracker for tracking movement or motion with respect to an eye of the user;
a microprocessor for generating the content to be rendered by the display;
a non-volatile, non-transitory storage medium comprising executable instructions for execution by the microprocessor, where the executable instructions when executed by the microprocessor configure the microprocessor to perform a process comprising the steps of: receive data from the eye tracker;
  determine a predetermined natural event with respect to the eye of the user in dependence upon the data received; and
  render to the user a next image of a sequence of images; wherein
each image of the sequence of images comprises:
  a foveal region representing a predetermined portion of a first field of view of the user at a current location of the user with a first direction having a first predetermined geometry and second predetermined dimensions;
  a non-foveal region representing a predetermined portion of a second field of view of the user at the current location with a second direction having a second predetermined geometry and second predetermined dimensions; and a transition region having a predetermined third predetermined geometry and third predetermined dimensions; wherein in a first image of the sequence of images the first direction and second direction are the same;

in a second image of the sequence of images the second direction is offset relative to the first direction by a predetermined angular offset;

in a third image of the sequence of images the first direction is set to the second direction in the second image of the sequence of images such that the first direction and second direction are the same but are now offset from the original first direction in the first image of the sequence of images by the predetermined angular offset; and the transition region blends from the foveal region to the non-foveal region according to a predetermined function.

In accordance with an embodiment of the invention there is provided a method comprising: rendering to the user a sequence of images relating wherein each image comprises:

a foveal region having a first predetermined geometry and second predetermined dimensions;

a non-foveal region having a second predetermined geometry and second predetermined dimensions; and a transition region having a predetermined third predetermined geometry and third predetermined dimensions; wherein in a first image of the sequence of images the foveal region is a first predetermined portion of a first field of view of the user at a current location of the user with a first direction;

in a last image of the sequence of images the foveal region is a first predetermined portion of a second field of view of the user at a current location of the user with a second direction;

the non-foveal region in each image of the sequence of images is a predetermined portion of a second field of view of the user at the current location with the second direction:

the second direction is offset from the first direction by a predetermined amount;

in each subsequent image of the sequence of images between the first image of the sequence of images and the second image of the sequence of images the foveal region comprises:

a first predetermined foveal portion comprising a first predetermined portion of the first field of view of the user at the current location of the user with the first direction; and a second predetermined foveal portion comprising a first predetermined portion of the second field of view of the user at the current location of the user with the second direction.

In accordance with an embodiment of the invention there is provided a system comprising: a display for rendering content to a user;

an eye tracker for tracking movement or motion with respect to an eye of the user;

a microprocessor for generating the content to be rendered by the display;

a non-volatile, non-transitory storage medium comprising executable instructions for execution by the microprocessor, where the executable instructions when executed by the microprocessor configure the microprocessor to perform a process comprising the steps of: receive data from the eye tracker;

determine a minor saccade with respect to the eye of the user in dependence upon the data received; and render to the user a next image of a sequence of images; wherein each image of the sequence of images comprises:

a foveal region having a first predetermined geometry and second predetermined dimensions;

a non-foveal region having a second predetermined geometry and second predetermined dimensions; and a transition region having a predetermined third predetermined geometry and third predetermined dimensions;

in a first image of the sequence of images the foveal region is a first predetermined portion of a first field of view of the user at a current location of the user with a first direction:

in a last image of the sequence of images the foveal region is a first predetermined portion of a second field of view of the user at a current location of the user with a second direction;

the non-foveal region in each image of the sequence of images is a predetermined portion of a second field of view of the user at the current location with the second direction;

the second direction is offset from the first direction by a predetermined amount;

in each subsequent image of the sequence of images between the first image of the sequence of images and the second image of the sequence of images the foveal region comprises:

a first predetermined foveal portion comprising a first predetermined portion of the first field of view of the user at the current location of the user with the first direction; and a second predetermined foveal portion comprising a first predetermined portion of the second field of view of the user at the current location of the user with the second direction.

In accordance with an embodiment of the invention there is provided a method redirecting motion of a user comprising:

a) determining a requirement to redirect the motion of the user from a current direction to a target direction;

b) determining an occurrence of an event with respect to an eye of a user;

c) determining whether the saccade is a minor saccade, a major saccade, or a blink;

d) upon determination of a minor saccade executing a next step of a first process which redirects the motion of the user from the current direction to the target direction in a number of steps;

e) upon determination of a major saccade or a blink executing a second process which redirects the motion of the user from the current direction to the target direction in a single step;

f) repeating steps (b) to (f) until motion of the user has been redirected to the target direction.

In accordance with an embodiment of the invention there is provided a system comprising:

a display for rendering content to a user;

an eye tracker for tracking movement or motion with respect to an eye of the user;

a microprocessor for generating the content to be rendered by the display;

a non-volatile, non-transitory storage medium comprising executable instructions for execution by the microprocessor, where the executable instructions when executed by the microprocessor configure the microprocessor to perform a process comprising the steps of:

a) determine a requirement to redirect the motion of the user from a current direction to a target direction;
b) determine an occurrence of an event with respect to an eye of a user;
c) determine whether the saccade is a minor saccade, a major saccade, or a blink;
d) upon determination of a minor saccade executing a next step of a first process which redirects the motion of the user from the current direction to the target direction in a number of steps;
e) upon determination of a major saccade or a blink executing a second process which redirects the motion of the user from the current direction to the target direction in a single step; and
f) repeat steps (b) to (f) until motion of the user has been redirected to the target direction.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Figure 1:
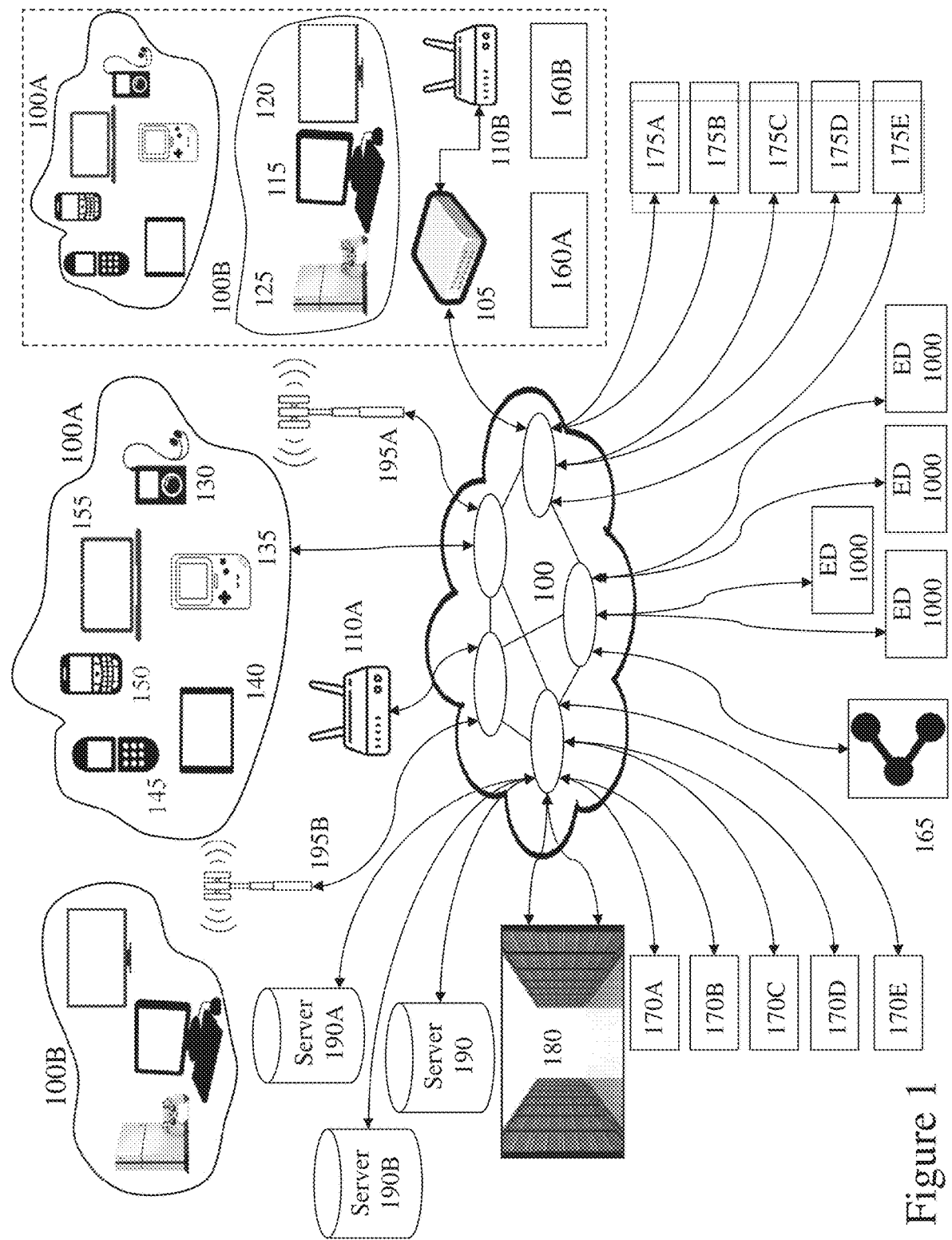
FIG. 1 depicts an exemplary network environment within which configurable electrical devices according to and supporting embodiments of the invention may be deployed and operate.

The present invention is directed to virtual reality and more particularly to locomotion within virtual reality environments where redirected walking allows a user to navigate a virtual environment spatially larger than the available physical space.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "wireless standard" as used herein and throughout this disclosure, refer to, but is not limited to, a standard for transmitting signals and/or data through electromagnetic radiation which may be optical, radio-frequency (RF) or microwave although typically RF wireless systems and techniques dominate. A wireless standard may be defined globally, nationally, or specific to an equipment manufacturer or set of equipment manufacturers. Dominant wireless standards at present include, but are not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, Bluetooth, Wi-Fi, Ultra-Wideband and WiMAX. Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella.

A "wired standard" as used herein and throughout this disclosure, generally refer to, but is not limited to, a standard for transmitting signals and/or data through an electrical cable discretely or in combination with another signal. Such wired standards may include, but are not limited to, digital subscriber loop (DSL), Dial-Up (exploiting the public switched telephone network (PSTN) to establish a connection to an Internet service provider (ISP)), Data Over Cable Service Interface Specification (DOCSIS), Ethernet, Gigabit home networking (G.hn), Integrated Services Digital Network (ISDN), Multimedia over Coax Alliance (MoCA), and Power Line Communication (PLC, wherein data is overlaid to AC/DC power supply). In some embodiments a "wired standard" may refer to, but is not limited to, exploiting an optical cable and optical interfaces such as within Passive Optical Networks (PONs) for example.

A "sensor" as used herein may refer to, but is not limited to, a transducer providing an electrical output generated in dependence upon a magnitude of a measure and selected from the group comprising, but is not limited to, environmental sensors, medical sensors, biological sensors, chemical sensors, ambient environment sensors, position sensors, motion sensors, thermal sensors, infrared sensors, visible sensors, RFID sensors, and medical testing and diagnosis devices.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, motion sensors, and head mounted displays (HMDs).

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others, see for example http://en.wikipedia.org/wiki/List_of_file_formats. Within a broader approach digital content mat include any type of digital information, e.g. digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer/supplier/provider of a device, service, etc. or they may be established by a user through a user interface for a device, a service or a PED/FED in communication with a device, another device, a server or a service provider etc.

A "computer file" (commonly known as a file) as used herein, and throughout this disclosure, refers to a computer resource for recording data discretely in a computer storage device, this data being electronic content. A file may be defined by one of different types of computer files, designed for different purposes. A file may be designed to store electronic content such as a written message, a video, a computer program, or a wide variety of other kinds of data. Some types of files can store several types of information at once. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is defined by its content since a file is solely a container for data, although, on some platforms the format is usually indicated by its filename extension, specifying the rules for how the bytes must be organized and interpreted meaningfully. For example, the bytes of a plain text file are associated with either ASCII or UTF-8 characters, while the bytes of image, video, and audio files are interpreted otherwise. Some file types also allocate a few bytes for metadata, which allows a file to carry some basic information about itself.

A "major saccade" as used herein, and throughout disclosure, refers to a quick, simultaneous movement of both eyes between two or more phases of fixation in the same direction. A major saccade is a rapid, ballistic movement of the eyes that abruptly changes the point of fixation. A major saccade is typically defined by movement of the eyes with a velocity greater than 180°.

A "minor saccade" or "microsaccade" as used herein, and throughout disclosure, refers to a fixational eye movements which are small, jerk-like, involuntary eye movements, similar to miniature versions of major saccades but typically occurring during visual fixation. A minor saccade is typically defined by movement of the eyes with a velocity less than 180°/second.

A "Head Mounted Display" (HMD) as used herein, and throughout this disclosure, refers to is a display device, worn on the head or as part of a helmet which has a small display device in front of one (monocular HMD) of a user or each eye of the user (binocular HMD). HMDs differ in whether they can display only computer-generated imagery (CGI) in what are referred to commonly as virtual reality (VR) or a virtual environment (VE), only live imagery from the physical world, or a combination thereof in what is referred to as augmented reality (AR) or mixed reality (MR).

An "eye-tracker" as used herein, and throughout this disclosure, refers to a device which measures rotations of an eye. Eye-trackers principally exploit measurement of the movement of an object (e.g. a special contact lens) attached to the eye; optical tracking without direct contact to the eye; and measurement of electric potentials using electrodes placed around the eyes. Optical methods are widely used for gaze-tracking and are favored for being non-invasive and inexpensive where light, for example infrared light, is reflected from the eye and sensed by a camera or some other specially designed optical sensor. The information is then analyzed to extract eye rotation from changes in reflections.

1. Re-Directed Walking

Since the early days of virtual reality researchers have investigated ways of users navigating virtual environments (VEs) that are spatially larger than the available Physical Tracked Space (PTS). A number of locomotion techniques relying on pointing devices or walking in-place were proposed which have since become customary in VE applications. However, users find these methods cumbersome and unnatural. The concept of redirected walking was introduced about 20 years ago in order to provide a more natural way of navigating VEs, albeit with many restrictions on the shape and size of the physical and virtual spaces. Re-directed walking is important as it has wide range of applications outside the dominant use of VEs for gaming. For example, an architect can "walk-through" an environment to assess aspects of its design; emergency responders can assess fire exits, emergency procedures etc.; users can wander virtual museums; users can physically move during participation in VEs for any application.

As noted above whilst a number of approaches have been proposed both in hardware and software these suffer limitations such as complexity, cost, introducing artifacts and distortions into the VE etc. or forcing the user to look away by inducing major saccades in order to allow the VE to be updates during a rapid eye movement. However, the inventors have established an alternate solution based upon the psychological phenomenon of inattentional blindness in conjunction with managing/partitioning the image content rendered to the user.

Inattentional blindness refers to the inability of an individual to see a salient object in plain sight, due to their lack of attention. The inventor's methodology exploits this phenomenon and further strengthen its effect with foveated rendering. Foveated rendering is a rendering technique whose primary objective is to reduce the workload on the microprocessor and/or graphics processor generating the images for rendering. Using eye tracking the user's eyes are tracked within the VE headset in real-time. The zone in the image corresponding to the foveal vision, i.e. the zone gazed by the fovea which provides sharp and detailed vision, is rendered at high quality. On the other hand, the zone in the image corresponding to the peripheral vision is rendered at a lower quality since the user's peripheral vision lacks acuity albeit it has a wider field of view. This process is performed without causing any perceptual change to the user.

Foveated rendering is supported today within hardware such as NVIDIA's RTX graphics card series which allows for real-time ray-tracing and software, such as hence, real-time performance as well as by techniques from eSight Corp. for managing content to be rendered through multiple files which are generated for an image to be rendered to the user and transmitted to the display for rendering.

Accordingly, the inventor's inventive methodology applies spatially varying rotations to different zones of the image rendered to the user according to the zone's importance using foveated rendering to strengthen the effect of inattentional blindness. Accordingly, a user's real world motion can be re-directed such that their motion within the real world is within a small physical space whilst their apparent VE motion is over a larger physical space. For example, a user may walk through a building navigating, for example, 300 meters (985 feet) where the actual physical space they walked within was a 4 m (13 foot) square room. User studies were performed to determine the maximum rotation angle and field-of-view for which participants do not perceive a change. These then were employed with foveated rendering to verify the in-situ gaze redirection in the VE environment results in equivalent motion of the user within the PTS. Beneficially, the inventor's methodology provides for increased VE travel within the PTS with reduced resets due to the user impacting a limit in the PTS, e.g. a wall. Further, as will become evident the techniques implemented by the inventors can be extended to provide not only redirected walking within a PTS which is devoid of obstacles, e.g. an empty room or space, but also within a PTS with obstacles, either fixed or mobile, including other users. Accordingly, through tracking multiple users a VE simulating, for example, an emergency evacuation can be performed with multiple users concurrently.

2. Exemplary Head-Mounted Display, Associated Electronic Devices, and Network Environment Supporting Embodiments of the Invention Referring to FIG. 1 there is depicted a Network 100 within which embodiments of the invention may be employed supporting Redirect Walking (RW) Systems, Applications and Platforms (RW-SAPs) according to embodiments of the invention. Such RW-SAPs, for example, supporting multiple communication channels, dynamic filtering, etc. As shown first and second user groups 100A and 100B respectively interface to a telecommunications Network 100. Within the representative telecommunication architecture, a remote central exchange 180 communicates with the remainder of a telecommunication service providers network via the Network 100 which may include for example long-haul OC-48/OC-192 backbone elements, an OC-48 wide area network (WAN), a Passive Optical Network, and a Wireless Link. The central exchange 180 is connected via the Network 100 to local, regional, and international exchanges (not shown for clarity) and therein through Network 100 to first and second cellular APs 195A and 195B respectively which provide Wi-Fi cells for first and second user groups 100A and 100B respectively. Also connected to the Network 100 are first and second Wi-Fi nodes 110A and 1101B, the latter of which being coupled to Network 100 via router 105. Second Wi-Fi node 1101B is associated with commercial service provider 160 and comprises other first and second user groups 100A and 100B. Second user group 100B may also be connected to the Network 100 via wired interfaces including, but not limited to, DSL, Dial-Up, DOCSIS, Ethernet, G.hn, ISDN, MoCA, PON, and Power line communication (PLC) which may or may not be routed through a router such as router 105. As will become evident in respect of FIGS. 2 and 3 PEDs and/or FEDs within first and second user groups 100A and 100B may provide the role of an electronic device, e.g. Electronic Device 204 or Electronic Device 310, to which a Head Mounted Display (HMD) may be interfaced in order to provide communications to/from Network 100 and therein other devices, systems, servers, etc.

Within the cell associated with first AP 110A the first group of users 100A may employ a variety of PEDs including for example, laptop computer 155, portable gaming console 135, tablet computer 140, smartphone 150, cellular telephone 145 as well as portable multimedia player 130. Within the cell associated with second AP 110B are the second group of users 100B which may employ a variety of FEDs including for example gaming console 125, personal computer 115 and wireless/Internet enabled television 120 as well as cable modem 105. First and second cellular APs 195A and 195B respectively provide, for example, cellular GSM (Global System for Mobile Communications) telephony services as well as 3G and 4G evolved services with enhanced data transport support. Second cellular AP 195B provides coverage in the exemplary embodiment to first and second user groups 100A and 100B. Alternatively the first and second user groups 100A and 100B may be geographically disparate and access the Network 100 through multiple APs, not shown for clarity, distributed geographically by the network operator or operators. First cellular AP 195A as show provides coverage to first user group 100A and environment 170, which comprises second user group 100B as well as first user group 100A. Accordingly, the first and second user groups 100A and 100B may according to their particular communications interfaces communicate to the Network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-1000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 or Bluetooth as well in an ad-hoc manner.

Also connected to the Network 100 are Social Networks (SOCNETS) 165, first and second service providers 170A and 170B respectively, first and second third party service providers 170C and 170D respectively, and a user 170E who may receive data from one or more RW-SAPs and/or HMD(s). Also connected to the Network 100 are first and second enterprises 175A and 175B respectively, first and second organizations 175C and 175D respectively, and a government entity 175E who may receive data from one or more RW-SAPs and/or HMD(s). Also depicted are first and second servers 190A and 190B may host according to embodiments of the inventions multiple services associated with a provider of Redirect Walking (RW) Systems, Applications and Platforms (RW-SAPs); a provider of a SOCNET or Social Media (SOME) exploiting RW-SAP features; a provider of a SOCNET and/or SOME not exploiting RW-SAP features; a provider of services to PEDS and/or FEDS; a provider of one or more aspects of wired and/or wireless communications; an Enterprise 160 exploiting RW-SAP features; license databases; content databases; image databases; content libraries; customer databases; websites; and software applications for download to or access by FEDs and/or PEDs exploiting and/or hosting RW-SAP features. First and second primary content servers 190A and 190B may also host for example other Internet services such as a search engine, financial services, third party applications and other Internet based services.

Also depicted in FIG. 1 are Electronic Devices (EDs) 1000 according to embodiments of the invention such as described and depicted below in respect of FIGS. 3A and 3B which support RW-SAPs functionality and features as described and depicted in respect of FIGS. 4A to 12 respectively. As depicted in FIG. 1 an ED 1000 may communicate directly to the Network 100 through one or more wireless or wired interfaces included those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, a consumer and/or customer (CONCUS) may exploit a PED and/or FED within an Enterprise 160, for example, and access one of the first or second primary content servers 190A and 190B respectively to perform an operation such as accessing/downloading an application which provides RW-SAP features according to embodiments of the invention; execute an application already installed providing RW-SAP features; execute a web based application providing RW-SAP features; or access content. Similarly, a CONCUS may undertake such actions or others exploiting embodiments of the invention exploiting a PED or FED within first and second user groups 100A and 100B respectively via one of first and second cellular APs 195A and 195B respectively and first Wi-Fi nodes 110A. It would also be evident that a CONCUS may, via exploiting Network 100 communicate via telephone, fax, email, SMS, social media, etc.

Figure 2:
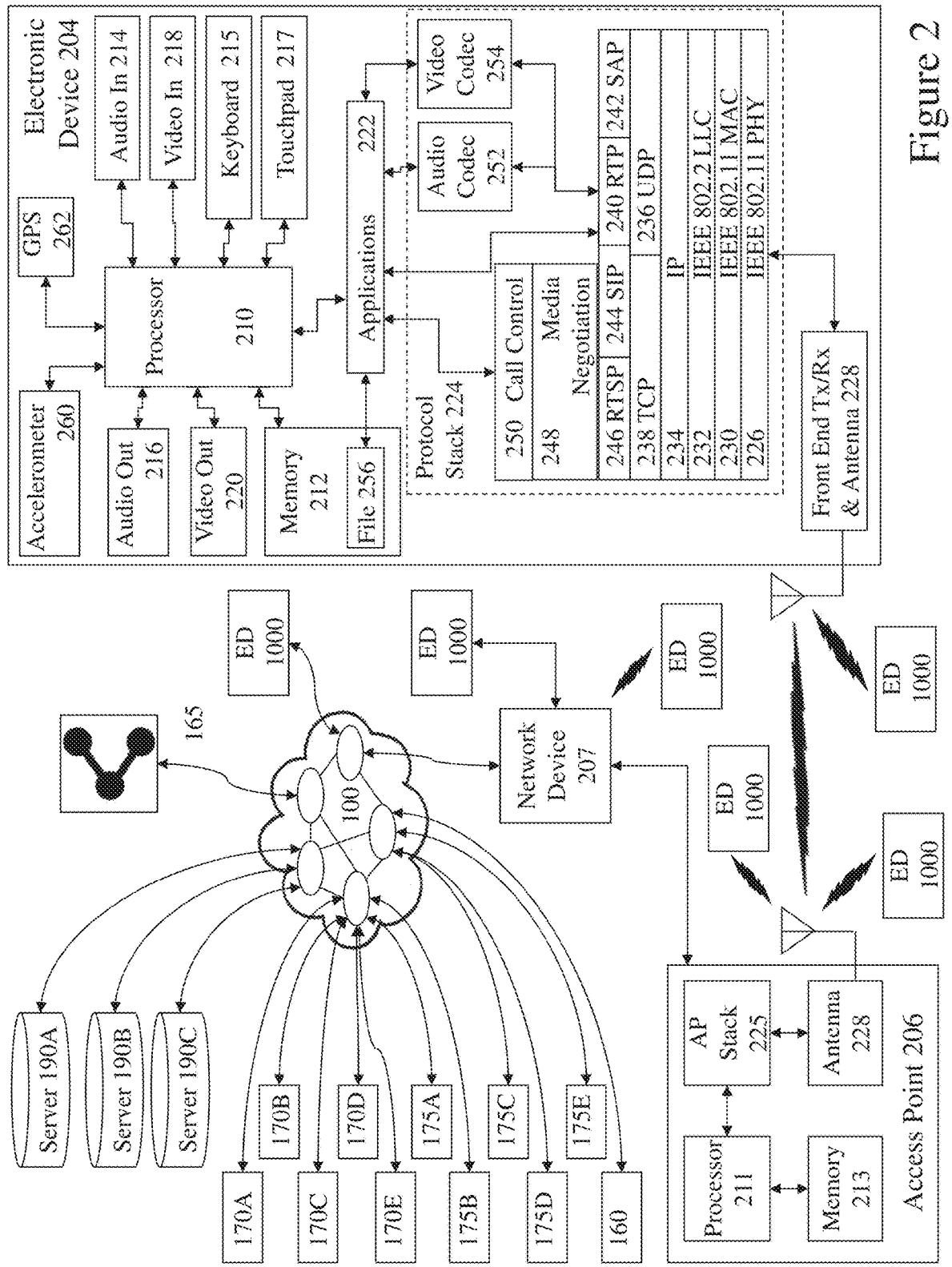
FIG. 2 depicts an exemplary wireless portable electronic device supporting communications to a network such as depicted in FIG. 1 and supporting embodiments of the invention.

Now referring to FIG. 2 there is depicted an Electronic Device 204 and network access point 207 supporting RW-SAP features according to embodiments of the invention. Electronic Device 204 may, for example, be a PED and/or FED and may include additional elements above and beyond those described and depicted. Also depicted within the Electronic Device 204 is the protocol architecture as part of a simplified functional diagram of a system that includes an Electronic Device 204, such as a smartphone 155, an Access Point 206, such as first AP 110, and one or more network devices 207, such as communication servers, streaming media servers, and routers for example such as first and second servers 190A and 190B respectively. Network Devices 207 may be coupled to Access Point 206 via any combination of networks, wired, wireless and/or optical communication links such as discussed above in respect of FIG. 1 as well as directly as indicated. Network devices 207 are coupled to Network 100 and therein Social Networks (SOCNETS) 165, first and second service providers 170A and 170B respectively, first and second third party service providers 170C and 170D respectively, a user 170E, first and second enterprises 175A and 175B respectively, first and second organizations 175C and 175D respectively, and a government entity 175E.

The Electronic Device 204 includes one or more Processors 210 and a Memory 212 coupled to Processor(s) 210. Access Point 206 also includes one or more Processors 211 and a Memory 213 coupled to processor(s) 211. A non-exhaustive list of examples for any of processors 210 and 211 includes a central processing unit (CPU), a digital signal processor (DSP), a reduced instruction set computer (RISC), a complex instruction set computer (CISC) and the like. Furthermore, any of Processors 210 and 211 may be part of application specific integrated circuits (ASICs) or may be a part of application specific standard products (ASSPs). A non-exhaustive list of examples for Memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 204 may include an audio input element 214, for example a microphone, and an audio output element 216, for example, a speaker, coupled to any of Processors 210. Electronic Device 204 may include a video input element 218, for example, a video camera or camera, and a video output element 220, for example an LCD display, coupled to any of Processors 210. Electronic Device 204 also includes a Keyboard 215 and Touchpad 217 which may for example be a physical keyboard and touchpad allowing the user to enter content or select functions within one of more Applications 222. Alternatively, the Keyboard 215 and Touchpad 217 may be predetermined regions of a touch sensitive element forming part of the display within the Electronic Device 204. The one or more Applications 222 that are typically stored in Memory 212 and are executable by any combination of Processors 210. Electronic Device 204 also includes Accelerometer 260 providing three-dimensional motion input to the Processor 210 and GPS 262 which provides geographical location information to Processor 210.

Electronic Device 204 includes a Protocol Stack 224 and AP 206 includes an Access Point Stack 225. Protocol Stack 224 is shown as an IEEE 802.11 protocol stack but alternatively may exploit other protocol stacks such as an Internet Engineering Task Force (IETF) multimedia protocol stack for example. Likewise, AP Stack 225 exploits a protocol stack but is not expanded for clarity. Elements of Protocol Stack 224 and AP Stack 225 may be implemented in any combination of software, firmware and/or hardware. Protocol Stack 224 accordingly, when providing an IEEE 802.11 protocol stack includes an IEEE 802.11-compatible PHY module that is coupled to one or more Front-End Tx/Rx & Antenna 228, an IEEE 802.11-compatible MAC module coupled to an IEEE 802.2-compatible LLC module. Protocol Stack 224 includes a network layer IP module, a transport layer User Datagram Protocol (UDP) module and a transport layer Transmission Control Protocol (TCP) module.

Protocol Stack 224 also includes a session layer Real Time Transport Protocol (RTP) module, a Session Announcement Protocol (SAP) module, a Session Initiation Protocol (SIP) module and a Real Time Streaming Protocol (RTSP) module. As depicted Protocol Stack 224 also includes a presentation layer Call Control and Media Negotiation module 250, one or more Audio Codecs 252 and one or more Video Codecs 254. Applications 222 may be able to create maintain and/or terminate communication sessions with any of Network Devices 207 by way of AP 206. Typically, Applications 222 may activate any of the SAP, SIP, RTSP, media negotiation and call control modules for that purpose. Typically, information may propagate from the SAP, SIP, RTSP, media negotiation and call control modules to PHY module through TCP module, IP module, LLC module and MAC module.

It would be apparent to one skilled in the art that elements of the Electronic Device 204 may also be implemented within the Access Point 206 including but not limited to one or more elements of the Protocol Stack 224, including for example an IEEE 802.11-compatible PHY module, an IEEE 802.11-compatible MAC module, and an IEEE 802.2-compatible LLC module. The Access Point 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, media negotiation module, and a call control module. Portable and fixed electronic devices represented by Electronic Device 204 may include one or more additional wireless or wired interfaces in addition to the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Also depicted in FIG. 2 are Electronic Devices (EDs) 100 according to embodiments of the invention such as described and depicted below in respect of FIGS. 3A and 3B. As depicted in FIG. 2 an ED 1000 may communicate directly to the Network 100. Other EDs 1000 may communicate to the Network Device 207, Access Point 206, and Electronic Device 204. Some EDs 1000 may communicate to other EDs 1000 directly. Within FIG. 2 the EDs 1000 coupled to the Network 100 and Network Device 207 communicate via wired interfaces but these may alternatively be wireless interfaces. The EDs 1000 coupled to the Access Point 206 and Electronic Device 204 communicate via wireless interfaces and/or wired interfaces. Each ED 1000 may communicate to another electronic device, e.g. Access Point 206, Electronic Device 204 and Network Device 207, or a network, e.g. Network 100. Each ED 1000 may support one or more wireless or wired interfaces including those, for example, selected from the group comprising IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, DSL, Dial-Up, DOCSIS, Ethernet, G.hn, ISDN, MoCA, PON, and Power line communication (PLC).

Accordingly, FIG. 2 depicts an Electronic Device 204, e.g. a PED, wherein one or more parties including, but not limited to, a user, users, an enterprise, enterprises, third party provider, third party providers, wares provider, wares providers, financial registry, financial registries, financial provider, and financial providers may engage in one or more activities and/or transactions relating to an activity including, but not limited to, e-business, P2P, C2B, B2B, C2C, B2G, C2G, P2D, D2D, gaming, regulatory compliance, architectural design, emergency services, etc. via the Network 100 using the Electronic Device 204 or within either the Access Point 206 or Network Device 207 wherein details of the transaction are then coupled to the Network 100 and stored within remote servers. Optionally, rather than wired and/or wireless communication interfaces devices may exploit other communication interfaces such as optical communication interfaces and/or satellite communications interfaces. Optical communications interfaces may support Ethernet, Gigabit Ethernet, SONET, Synchronous Digital Hierarchy (SDH) etc.

Figure 3B:
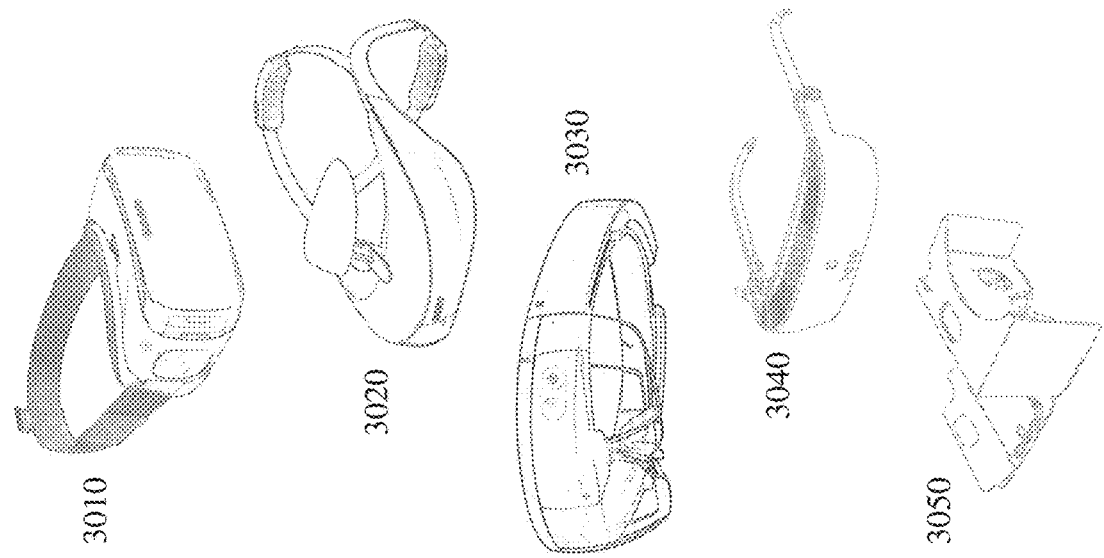
FIG. 3B depicts exemplary commercial HMDs supporting embodiments of the invention.
Figure 3A:
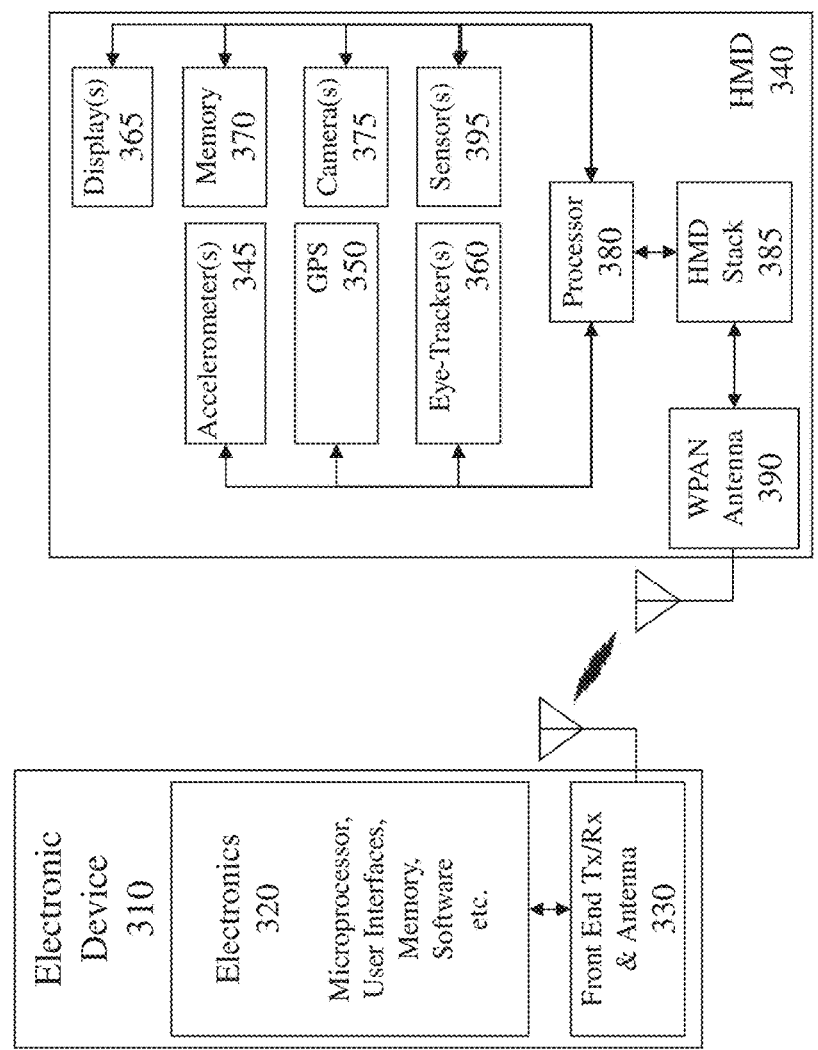
FIG. 3A depicts an exemplary head mounted display (HMD) supporting communications to a network such as depicted in FIG. 1, an electronic device such as described in FIG. 2, and supporting embodiments of the invention.

Within embodiments of the invention the Electronic Device 204 may itself be an HMD or as described and depicted in respect of FIG. 3A an Electronic Device 310, such as Electronic Device 204, for example may interface to an HMD 340. Accordingly, as depicted in FIG. 3A the HMD 340 is coupled to an Electronic Device 310 through a Wireless Personal Area Network (WPAN) interface between Front End Tx/Rx & Antenna (Antenna) 330 and WPAN Tx/Rx & Antenna 390. Antenna 330 is connected to Electronics 320 which comprises the microprocessor, user interfaces, memory, software etc. as described with respect to Electronic Device 204 in FIG. 2.

Within HMD 340 the WPAN Antenna 390 is connected to HMD Stack 385 and therein to Processor 380. As depicted the Processor 340 is coupled to elements of the HMD 340 which include, but are not limited to, Accelerometer(s) 345, GPS Receiver 350, Eye-Tracker(s) 360, Display(s) 365, Memory 370, Camera(s) 375 and Sensor(s) 395. Within other embodiments of the invention the HMD 340 may be designed solely for immersive applications and not include a Camera(s) 375. Similarly, the HMD 340 may not include a GPS Receiver 350 to provide location data in conjunction with motion tracking provided by the Accelerometer(s) 345. Optionally, the HMD 340 may not include Sensor(s) 395. However, within embodiments of the invention the Sensor(s) 395 may include orientation sensors, such as tilt sensors for example, and distance measurement sensors. For example, a distance measurement sensor may include, but not be limited to, a Light Detection and Ranging sensor (lidar), sound navigation ranging (sonar), a structured light source or structured light 3D scanner, such that the HMD 340 can determine a distance or distances to objects within the environment of a user of the HMD 340 which supports embodiments of the invention. Accordingly, within the embodiments of the invention described and depicted in respect of FIGS. 4A to 12 for the redirection of a user's motion a HMD 340 may establish an initial measurements of environment the user of the HMD 340 is within together with the user's location within that environment and employ this data to define aspects of the redirection process according to embodiments of the invention. Further, the redirection process according to embodiments of the invention may receive continuous and/or periodic environment updates to provide additional data for the redirection process according to embodiments of the invention or initiate a reset.

Further, whilst the redirection process according to embodiments of the invention is described and depicted in FIGS. 4A to 12 with respect to a user within a defined space devoid of obstacles it would be evident that the exploitation of such Sensor(s) 395 to provide environment information can also be employed within the redirection process according to embodiments of the invention to allow the user's motion to be redirected such that they avoid real world physical objects whilst interacting with the virtual environment being presented to them. For example, a user employing a HMD 340 with visual defects or degradations may be presented with a virtual environment wherein the redirection process according to embodiments of the invention employed allow the user to navigate their environment where their motion would otherwise lead them to hit an element of their environment, e.g. wall, door, chair, etc. Accordingly, whilst the redirection process according to embodiments of the invention are described and depicted with respect to a user achieving a large virtual travel distance within a space smaller than the distance travelled the redirection process according to embodiments of the invention may also be employed where the user's space is not as restricted or limited.

Optionally, within other embodiments of the invention the Sensor(s) 395 may be associated with other electronic devices worn and/or carried by the user for example wherein the data from these Sensor(s) 395 is communicated to the HMD 340 where the redirection process according to embodiments of the invention are performed by the Processor 380 within the HMD 340. Accordingly, the Sensor(s) 395 may be associated with wearable devices as well as PEDs and/or FEDs. Alternatively, where the redirection process according to embodiments of the invention are performed by another electronic device, e.g. Electronic Device 310 in FIG. 3A, then the data from the Sensor(s) 395 within the HMD 340 or other electronic devices worn and/or carried by the user would be communicated to the processor within the Electronic Device 310. Alternatively, processing may be provided by a remote service upon a remote server wherein the data from the Sensor(s) 395 within the HMD 340 or other electronic devices worn and/or carried by the user would be communicated to the remote server or service.

Optionally, the HMD 340 may include one or more haptic interfaces which provide information to the user by means other than through the Display(s) 365. For example, the HMD 340 may include a vibratory motor, a loudspeaker, a buzzer etc. which is triggered by a redirection process according to an embodiment of the invention, such as for example when a reset is to be performed, when the redirection process is exceeding a predetermined limit to seek redirection without a reset, etc. Optionally, the one or more haptic interfaces may be within one or more other electronic devices worn and/or carried by the user and receive data from one or more of the HMD 340, Electronic Device 310, or remote server etc. Accordingly, the haptic interface(s) may be associated with wearable devices.

Accordingly, HMD 340 may, for example, utilize the processor within Electronic Device 310, e.g. Processor 210 within Electronic Device 204 in FIG. 2, processing functionality such that a lower power Processor 380 may be employed within HMD 340 controlling, for example, acquisition of image data from Camera(s) 375, Sensor(s) 395, Eye-Tracker(s) 360, Accelerometer(s) 345 2076 and presentation of image data to the user via Display(s) 365 with information including one or more of instruction sets, algorithm(s), user profile(s), user biometric data etc. being stored within a memory of the HMD 340, not depicted for clarity or an electronic device, such as Electronic Device 310, which is exchanging data/information with HMD 340, e.g. the Electronic Device 310 and HMD 340 may be paired as known in wireless interfacing.

As noted above a HMD 340 may be employed to simply present visual content to the user, e.g. within an immersive virtual reality environment, or it may be employed to provide visual content to the user which has been processed to address and/or compensate for visual defects and/or vision degradations etc. either in an immersive virtual reality environment, an immersive real world environment, or an augmented reality environment. Accordingly, the HMD 340 and/or an electronic device associated with the user, e.g. Electronic Device 310, may store data relating to a particular individual's visual defects within a memory, such as Memory 212 of Electronic Device 204 in FIG. 2A or Memory 370 of HMD 340. This information may be remotely transferred to the Electronic Device 204 and/or HMD 340 from a remote system via Network Device 207 and Access Point 206, for example. Whilst FIG. 3A depicts a wireless interface between Electronic Device 310 and HMD 340 it would be evident that within other embodiments of the invention a wired connection may be employed discretely or in combination with a wireless interface. For example, an eSight Generation 3 HMD, as depicted in fourth image 3040, supports a wired USB connection to a PED/FED as well as a Bluetooth connection. Within HMD 340 the Processor 380 may execute embodiments of the invention discretely, in combination with the processor of Electronic Device 310, or through communications directly from HMD 340 or via Electronic Device 310 to one or more remote devices and/or services (e.g. a cloud based service). Similarly, the processing of image data acquired from the Camera(s) 375 may be solely within the HMD 340, solely within the PED 310, distributed between them, capable of executed independently upon both, or dynamically allocated according to constraints such as processor loading, battery status etc.

Accordingly, the image acquired from a Camera 375 associated with the HMD 340 may be processed by the HMD 340 directly but image data to be displayed may also be acquired from an external source directly or acquired and processed by the Electronic Device 310 for combination with that provided by the HMD 340 itself, in replacement of a predetermined portion of the image acquired by the HMD 340 or as the image(s) to be displayed to the user of the HMD 340. Whilst, within the following description with respect to FIGS. 4A to 12 the HMD 340 is employed in an immersive mode, e.g. no external environment is presented to the user, such as a game, virtual reality environment etc. However, it would be evident that the embodiments of the invention may also be employed within non-immersive modes of an HMD 340 such as those provide augmented reality or assistance to a user.

Within embodiments of the invention the HMD 340 and any user interface it provides directly or upon a PED, such as Electronic Device 310, may be context aware such that the user is provided with different interfaces, software options, and configurations for example based upon factors including but not limited to cellular tower accessed, Wi-Fi/WiMAX transceiver connection, GPS location, local associated devices, dimensions of measured environment etc. Accordingly, the HMD 340 may be reconfigured upon the determined context of the user based upon the PED determined context. Optionally, the HMD 340 may determine the context itself based upon any of the preceding techniques where such features are part of the HMD 340 configuration as well as, for example, based upon processing the received image from the Camera(s) 375 and/or content being rendered upon the Display(s) 365. For example, the HMD 340 configuration and processing according to embodiments of the invention may change according to whether the user is walking, running, crawling, riding a bicycle, driving a vehicle, etc.

Referring to FIG. 3B there are depicted exemplary first to fifth HMDs 3010 to 3050 of HMDs which can exploit a redirection process according to an embodiment of the invention. Accordingly, these are:

First HMD 3010 Samsung Gear VR HMD;
Second HMD 3020 Sony HMZ-T3 W HMD;
Third HMD 3030 Microsoft™ Hololens HMD;
Fourth HMD 3040, eSight Generation 3 providing immersive and non-immersive environments through a bioptic tilt of the displays relative to the frame; and
Fifth HMD 3050, Google Cardboard which supports insertion of a smartphone for example and in conjunction with software splits the display of the smartphone into two regions each presented to only one eye of the user.

3. Re-Directed Walking

One of the most important forms of interaction in VE is locomotion. Natural walking (or even jogging, running etc.) is the most preferred (and natural) technique primarily because it provides an increased sense of presence in the VE with improved spatial understanding whilst reducing signs of VR sickness. However, the main difficulty of using natural walking as a locomotion technique in VE is the requirement that the size of the PTS be comparable in size with the VE, which is often not the case; especially for simulations involving large-scale environments. Today this is still an active area of research with a particular focus on locomotion techniques which do not carry, in any degree, the spatial constraints imposed by the physical space over to the theoretically boundless virtual space of the VE.

Accordingly, over recent years many techniques have been proposed for a user's interaction in a VE and in particular, their navigation. This related work is broadly categorized in terms of being (a) redirection, (b) steering algorithms, resetting phase and natural visual suppressions, and (c) dynamic foveated rendering.

3A. Redirection and VE

"Redirected Walking" has been an active research topic for nearly 20 years and exploits subtle rotations in the VE which are presented to the VE users so that they were tricked into walking on a curved path in the PTS while maintaining a straight path in the VE. These subtle rotations applied to the VE were enough to convince the users that they had explored a comparatively larger virtual area than the actual available play space. Since the original concept of redirected walking was proposed a number of attempts were made to achieve the same effect based on software and/or hardware. Some researchers have even tried incorporating physical props or manipulating the entire physical environment. However, these type of solutions failed to gain the mainstream attention due to their many dependencies on factors other than the actions of the user himself.

Hardware-based approaches were also explored to resolve this problem such as the omnidirectional treadmill, suspended walking, low-friction surfaces, walking in a giant hamster ball (e.g. VirtuSphere), etc. However, whilst these prototypes, although bulky, expensive and not easily established in any PTS, offer potentially infinite walking in VE within a defined PTS they all lack inertial force feedback. For this reason, natural walking is considered to be the most preferred and natural way for locomotion in VE. Moreover, the multimodal nature of natural walking allows free user movements such as jumping or crouching as well as variable speeds from walking through to running.

Software-based techniques have also been proposed for achieving the same effect by solely manipulating the VE and are generally divided into two groups, namely those techniques that use the user's head rotations and translations for scaling the VE dynamically based on the scenario and those techniques that partially or fully warp the virtual environment. Due to the dominance of the visual sense over the other human senses, these techniques focus mainly on reducing the effect of subtle visual distractions resulting from repeated redirection. These visual distractions are mainly created during the naturally occurring or stimulated visual suppressions such as a blink or a saccade. However, a disadvantage of these techniques is the fact that they are disruptive to the cognitive task at hand, since they rely on stimulating saccades by introducing artifacts in the rendered image to distract the user's attention.

3B. Steering Algorithms, Resetting Phase and Natural Visual Suppressions

Considering initially steering algorithms then in order to calculate the amount of redirection, two parameters are required, namely, the target direction of the user (a) in the VE, and (b) in the PTS. There are many methods for predicting the target direction in VE ranging from using the user's past walking direction, to head rotations, and gaze direction. As there are spatial constraints in terms of the available PTS, the user must be steered away from the boundaries of the PTS, typically a wall for example. To locate the user's target direction a variety of techniques and related algorithms have been proposed and assessed including, but not limited to, steer-to-center, steer-to-orbit, and steer-to-multiple-targets. The first steers the user towards the center of the PTS whilst steer-to-orbit steers them towards an orbit around the center of the PTS and steer-to-multipletargets steers the users towards several assigned waypoints in the PTS. Extensions of these have included, the steer-to-multiple-centers algorithm, limiting the directions of walking by virtual objects in the VE to enhance the steer-to-orbit algorithm, and predetermined curves inside the VE where a user was allowed to change their direction of walking only when they reached the intersection of their current curve with another predetermined curve.

Within the following descriptions with respect to embodiments of the invention and the experimental results of user studies etc. the inventors have employed the steer-to-center algorithm for redirecting the user towards center of the PTS when a collision is predicted to occur. However, it would be evident that the methodologies presented, and embodiments of the invention may be employed with other steering algorithms, etc. without departing from the scope of the invention. It would also be evident to one of skill in the art that the steering algorithm etc. employed may be defined for a VE system, for a VE session, based upon the PTS, or be dynamically established based upon aspects of one or more of the VE session, PTS and the user. For example, the steering mechanism may vary during a VE session, for example through the addition of a second user. Accordingly, the scope of the invention is not limited by the embodiments of the invention presented below but by the scope of the claims.

With respect to the resetting phase then this is an important aspect of all redirected walking techniques because there is always a small possibility of the user crossing over the boundary of the PTS, e.g. reaching a physical boundary such as a wall or walking into a physical object within the PTS. If this occurs, the user has to be stopped and their position has to be reset before starting to walk again, hence the term re-set phase. Several solutions have been proposed to address this problem including, but not limited to, "Freeze-Turn" where the field-of-view (FoV) of the user remains unchanged whilst they turn in the PTS, "Freeze-Back-up" where the FoV remains unchanged whilst the user backs-up from the boundary to a point motion can resume, and "Turn" where a multiplier of the rotational gain, e.g. x2, is applied to the user's head rotations, i.e. if the user turns by 180°, a rotation of 360° is applied so that the user is again facing the same direction that they were facing before. Visual effects which may result from the resetting can be addressed with the use of visual distractors.

Within the following descriptions with respect to embodiments of the invention and the experimental results of user studies etc. the inventors have employed the "stop-and-go" paradigm where if the user crosses over a boundary, then before they start walking again, they have to perform an in-situ rotation towards a direction where there is no obstacle. However, it would be evident that that the methodologies presented, and embodiments of the invention may be employed with other resetting phase processes, etc. without departing from the scope of the invention. It would also be evident to one of skill in the art that the reset employed may be defined for a VE system, for a VE session, based upon the PTS, or be dynamically established based upon aspects of one or more of the VE session, PTS and the user. For example, the reset mechanism may vary during a VE session, for example through the addition of a second user. Accordingly, the scope of the invention is not limited by the embodiments of the invention presented below but by the scope of the claims.

The human visual system of even a healthy individual with 20/20 vision (a term used to express normal visual acuity (the clarity or sharpness of vision) measured at a distance of 20 feet) is not perfect. Due to several very frequent involuntary actions, humans face temporary blindness for short periods of time, called visual suppressions. Saccades, eyeblinks, the phase of nystagmus, and vergence movements are some of the involuntary visual suppressions. Saccades are the brief rapid eye movements that occur when we quickly glance from one object to another whilst an eye-blink is a rapid opening and closing of the eyelids, where these eye movement can occur either voluntarily, involuntarily or as a reflex. The phase of nystagmus is a condition where uncontrolled rapid eye movements occur from side-to-side, top-to-bottom or in circular motion whilst vergence movement occurs to focus on the objects with different depths, one after the other.

Within the following only techniques employing saccades and eye-blinks are reviewed as embodiments of the invention may also exploit these. Saccades are extremely unpredictable, rapid, and ballistic eye movements that occur when we abruptly shift our fixation point from one object to another. The visual suppression occurs before, during, and after the saccadic movement and can last for 20-200 ms whilst the speed of these saccadic movements can reach up to 900°/s. As a saccade occurs very frequently and can last for several frames (considering typical frame rates of standard and high definition systems) which makes it possible to render an updated VE without the user noticing. In contrast to the saccades, blinks occur much less frequently and are much slower thereby giving more flexibility for reorientation due to the longer induced change blindness. Depending upon the scenario, one blink can give the users a temporary blindness of 100-400 ms which is much longer than a saccade. This also makes them easier to detect even with readily available commercial eye trackers. Similar to saccades, our visual perception is also suppressed before, during, and after the opening and closing movements of the eyelids. Studies have shown that the average person blinks at an average rate of 17 times per minute.

Within the following descriptions with respect to embodiments of the invention and the experimental results of user studies etc. the inventors have exploited this physiological phenomenon to refresh the foveal zone render and therefore redirect the user multiple times per minute during blinks and/or minor saccades. Additionally, embodiments of the invention exploit reported data for the maximum rotational and translational thresholds for VE during blinks and saccades to update the VE and refresh the render without the user perceiving anything. However, it would be evident that that the methodologies presented, and embodiments of the invention may be employed with other natural vision suppressions according to the capabilities of the HMD and/or associated software, firmware etc. For example, improved eye-tracking may allow detection of minor and/or major saccades allowing partial or full updating during these. For example, partial updating may update a portion of the foveal region and/or peripheral region. It would also be evident to one of skill in the art that the natural vision suppression(s) employed may be defined for a VE system, for a VE session, based upon the PTS, or be dynamically established based upon aspects of one or more of the VE session, PTS and the user. For example, the natural vision suppression may vary during a VE session, for example through the addition of a second user, detection of a change in a physiological aspect of the user, or based upon characterization of one or more vision degradations and/or defects of the user. Accordingly, the scope of the invention is not limited by the embodiments of the invention presented below but by the scope of the claims.

3C. Dynamic Foveated Rendering

This technique can significantly reduce the overall workload on a microprocessor, e.g. a central processor unit (CPU) or dedicated graphics processor unit (GPU), while providing the same VE experiences to the user. Foveated rendering leverages the fact that small changes occurring in our peripheral vision are imperceptible to us. Thus, the area of the image corresponding to the peripheral vision can be rendered at a much lower resolution while the area of the image corresponding to the foveal vision is rendered at full resolution. Solutions to this have been established with different software-based techniques for simulating perceptually guided foveated rendering as well as hardware solutions Within the following descriptions with respect to embodiments of the invention and the experimental results of user studies etc. the inventors have exploited a hardware based solution, Nvidia's Variable Rate Shading (VRS) such that foveated rendering was supported in hardware and integrated into the rendering pipeline. However, it would be evident that that the methodologies presented, and embodiments of the invention may be employed with foveated rendering techniques exploiting other hardware and/or software based solutions according to the capabilities of the HMD and/or associated software, firmware etc. For example, embodiments of the invention may exploit hardware based foveated rendering, software based foveated rendering and/or a combination of hardware and software based foveated rendering. For example, software based foveated rendering may exploit approaches to process the image data in multiple files to parallel pipelines and process foveal content differently to peripheral content, or an effective frame-rate of presenting peripheral content relative to foveal content may be lower. It would also be evident to one of skill in the art that the foveated rendering employed may be defined for a VE system, for a VE session, based upon the PTS, or be dynamically established based upon aspects of one or more of the VE session, PTS and the user. For example, the foveated rendering may vary during a VE session, for example through the addition of a second user, detection of a change in a physiological aspect of the user, or based upon characterization of one or more vision degradations and/or defects of the user. Accordingly, the scope of the invention is not limited by the embodiments of the invention presented below but by the scope of the claims.

It would also be evident from the following descriptions with respect to embodiments of the invention that the inventors have exploited the Nvidia's VRS not only for reducing the overall GPU workload but also for blending foveal and non-foveal (peripheral) zones rendered from two co-located cameras, respectively. However, the inventors note that within the prior art software based solutions for the merging/blending/overlay of content from multiple sources exist within other HMD applications such as for augmented reality etc. Accordingly, the scope of the invention is not limited by the embodiments of the invention presented below but by the scope of the claims.

4. Technical Overview

Figure 4A:
FIG. 4A depicts orientation-based redirection using dynamic-foveated rendering which leverages the effect of inattentional blindness induced by a cognitive task according to an embodiment of the invention.

Referring to FIG. 4A there is depicted an exemplary image depicting orientation-based redirection according to an embodiment of the invention in conjunction with dynamic foveated rendering which leverages the effect of inattentional blindness induced by a cognitive task. The blending (e.g. parallax of green Alien 440) in the Transition Zone 420 between the rotated non-foveal virtual environment (Non-Foveal VE 430) and the non-rotated foveal (Foveal VE 410) is imperceptible by the users due to inattentional blindness. The angular gain for the frame as shown in FIG. 4A was at the maximum employed, i.e. 13.5°.

Figure 4B:
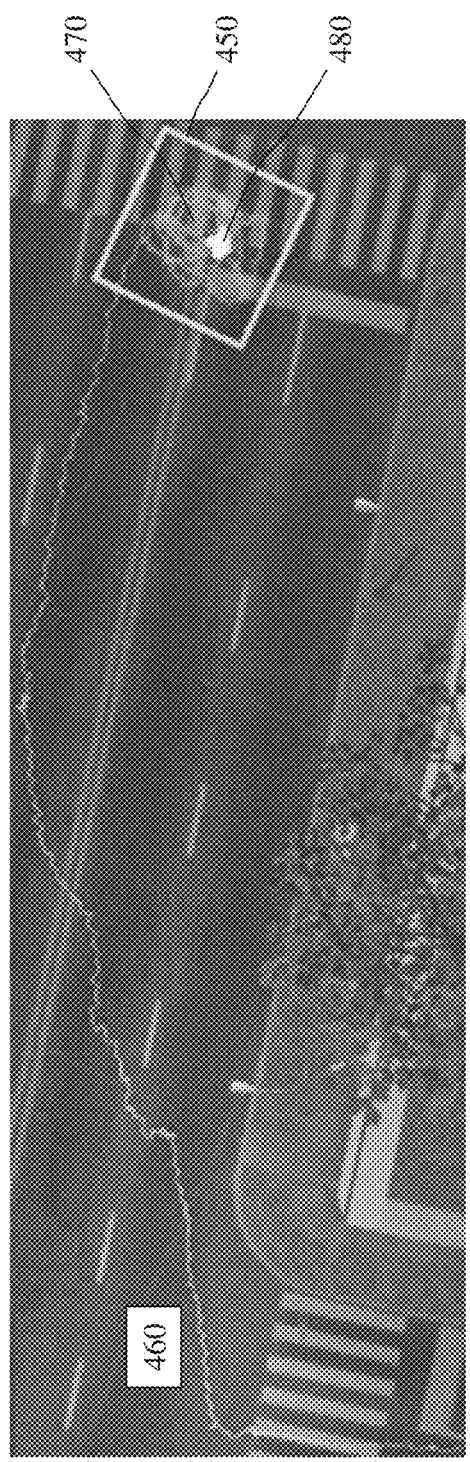
FIG. 4B depicts an image of a path walked in physical tracked space (PTS) with the corresponding path in the virtual environment (VE) achieved by a user exploiting an HMD supporting embodiments of the invention.

Accordingly, a user exploiting an embodiment of the invention may traverse as depicted in FIG. 4B a path within the VE (VE Path 460) which is significantly larger than the Physical Tracked Space (PTS 450) where through re-direction they execute a PTS Path 470. The PTS 450 is a 4 meter×4 meter (approximately 13 feet by 13 feet). The Camera 1480 icon inside the box indicates the location of the user with respect to the PTS 450. The PTS 450 represents a room-scale PTS wherein users were able to walk distances in the VE which were substantially larger. The VE Path 460 depicted is 58.51 meters (approximately 192 feet) without a reset which is 15 times the length or width of the PTS 450. The longest distance recorded in experiments for this PTS 450 with prototype embodiments of the invention was 103.9 meters (approximately 341 feet) or 26 times the length or width of the PTS 450.

Figure 5:
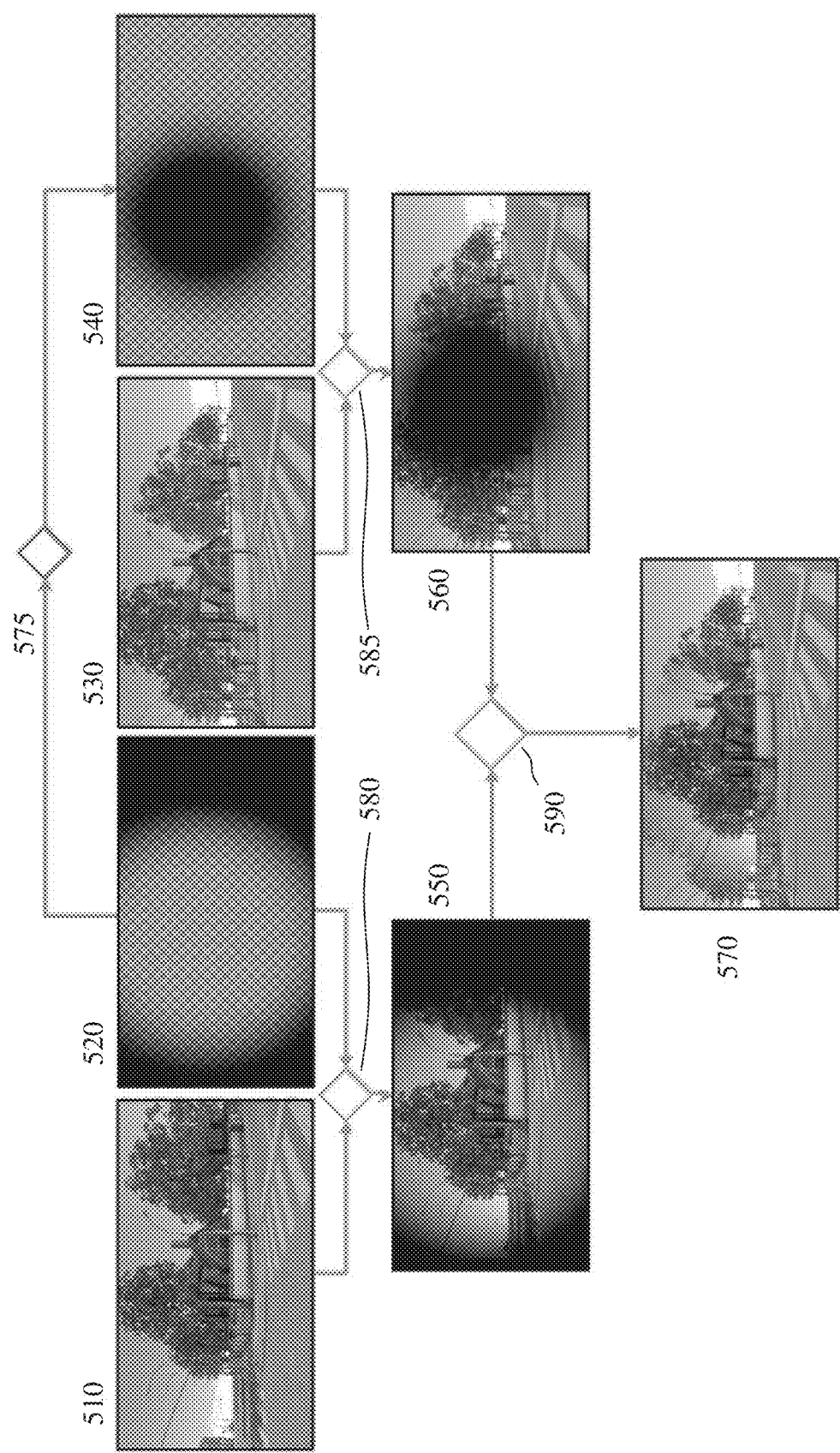
FIG. 5 depicts an exemplary pipeline for implemented redirecting walking according to an embodiment of the invention exploiting rendering the VE from two co-located cameras.

Now referring to FIG. 5 there is depicted a pipeline of an embodiment of the invention. Two cameras, $\text{Cam}_{Foveal}$ and $\text{Cam}_{Non-Foveal}$, are employed within this exemplary pipeline to render the VE to the user. Based upon results of the first user study outlined below the inventors determined that the appropriate field-of-view, S, for the foveal region was 60° within the image acquired by $\text{Cam}_{Foveal}$ and that the rotation angle applied to the non-foveal image. $\text{Cam}_{Non-Foveal}$, had a maximum value of 13.5°, i.e. $0° < \theta < 13.5°$. Accordingly, a first Mask 520 corresponding to $\delta = 60°$ was applied to the Foveal Image 510, i.e. the image of $\text{Cam}_{Foveal}$, in First Process 580 to generate Foveal Masked Render 550. In Second Process 585 an inverse of the first Mask 520, second Mask 540 generated by an inversion process 575, is applied to the Non-Foveal Image 530, i.e. the image of $\text{Cam}_{Non-Foveal}$ which is rotated relative to $\text{Cam}_{Foveal}$ by $\theta$, to generate Non-Foveal Masked Render 560. Then in Third Process 590 the Foveal Masked Render 550 and Non-Foveal Masked Render 560 are combined to generate the Rendered Image 570 presented to the user upon their HMD. Accordingly, the rotation applied between the Foveal Image 510 and Non-Foveal Image 530 is evident in FIG. 5. As will be evident from the results of the second and third user studies the users fail to perceive any visual distractions or artifacts in the final composite render, Rendered Image 570, while they are preoccupied with a cognitive task; which is almost always the case in VE applications.

5. User Study 1 Determining Maximum Rotation Angle and Field of View of the Foveal Image Rendered The efficacy of redirected walking is coupled with the user's perception of the redirection taking place. In the inventor's first user-study they determined the maximum angle for which the rotation of the non-foveal zone (i.e. the area in the rendered image corresponding to the peripheral vision) remained imperceptible to the user.

5A. Application

The inventor's designed an immersive VE application using the HTC Vive Pro Eye HMD with an integrated Tobii Eye Tracker. The application depicted a serene urban city environment in which red spheres were hidden at random locations. The environment was developed in Unity3D and foveated rendering was supported using an NVIDIA RTX 2080Ti graphics card. Three zones were specified for the foveated rendering, foveal zone, non-foveal zone and transition zone.

5A.1. Foveal Zone

The foveal zone was defined as the circular area in the rendered image centered at the fixation point captured by the eye tracker. For rendering, this zone should have the highest quality since this is where the user's foveal vision is focused. Within the following description with respect to an embodiment of the invention the pixels in the foveal zone were rendered with a 1:1 sampling was employed although other samplings may be employed without departing from the scope of the invention. It would be evident that within other embodiments of the invention the foveal zone may be defined by another geometry, e.g. elliptical, or that the foveal zone may be defined in dependence upon characterisation of the user's foveal zone where the user has visual defects or vision degradations. This assessment may also determine that the user has a visual axis of vision offset relative to that of the fovea-retina in order to overcome a visual defect or vision degradation which may be factored into the calibration and settings of the eye-tracker.

5A.2. Non-Foveal Zone

The non-foveal zone is the area in the rendered image which corresponds to the peripheral vision. This being complementary to the foveal zone in the exemplary pipeline of FIG. 5 although it would be evident that this represents one specific embodiment of the invention and that other non-foveal zones may be defined with or without specific reference to the foveal zone. This zone is of lower importance than the foveal zone since it is not the main focus of the user's vision. Hence, pixels in the non-foveal zone are rendered with a different sampling to the foveal zone. Within the following description with respect to an embodiment of the invention a 16:1 sampling was employed although other samplings may be employed without departing from the scope of the invention.

5A.3. Transition Zone

The transition zone is an overlapping or non-overlapping area as the rendered image transitions from the foveal zone to the non-foveal zone. This zone was introduced by the inventors in order to avoid a sharp boundary edge between the foveal and non-foveal zones which may be perceived by the user. Within the following description with respect to an embodiment of the invention the transition zone was rendered at a constant sampling of 4:1 between that of the foveal zone and the non-foveal zone. However, it would be evident that within other embodiments of the invention the transition zone may employ graded sampling between that of the foveal zone and the non-foveal zone where the transition function may be, for example, linear or Gaussian although other functions may be employed either mathematically or non-mathematically defined.

Figure 6:
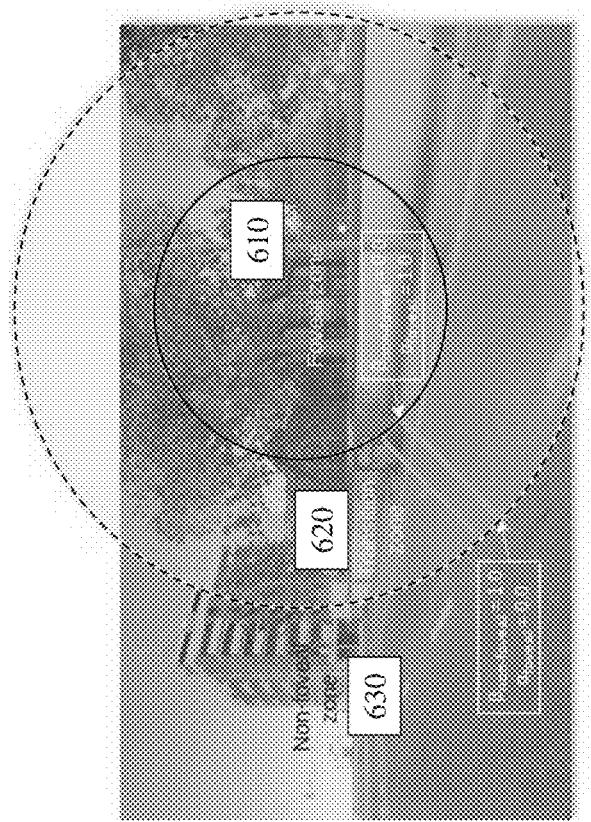
FIG. 6 depicts a user's perspective during a first user study within a VE as rendered according to an embodiment of the invention.

FIG. 6 depicts a frame from the application with the three zones annotated. The visible frame within the VE application was panoramic and significantly larger than the image actually shown which depicts only part of the frame relevant to the discussion, The Foveal Zone 610 corresponding to a field-of-view is marked with a solid circle and was rendered at the highest quality with 1:1 sampling and no rotation. The Non-Foveal Zone 630 was rendered at a lower resolution with 16:1 sampling with a rotation of $\theta_{NON-FOVEAL}$. The Transition Zone 620 is depicted as a dashed circle around the Foveal Zone 610 as was rendered at a 4:1 sampling. This indicates the overlapping area between the foveal and non-foveal zones for which alpha-blending was performed at each pixel using Equation (1), where $C_{BLENDED}$ is the final colour of any pixel in the transition zone, $\alpha_{FOVEAL}$ is the alpha value for the foveal image which changes from 1 to 0 from the foveal to the non-foveal zones, and $C_{FOVEAL}$ and $C_{NON-FOVEAL}$ are the foveal and non-foveal colours at a pixel respectively.

$$C_{BLENDED} = \alpha_{FOVEAL} \times C_{FOVEAL} + (1 - \alpha_{FOVEAL}) \times C_{FOVEAL} \quad (1)$$

This requires two co-located cameras (or images representing images acquired by two co-located cameras) which have a rotational offset between them. Within the following embodiments of the invention this rotational offset was not fixed for all user studies. Within the first user study this rotational offset was increased until the users either saw artifacts in their field of view of felt that there were artifacts in their field of view. This was to measure the minimum field of view for the foveal zone for which the rotational offset between the two collocated cameras is maximized. Thereafter, in all user studies we increased the rotational offset at a constant rate of 6°/s from 0° to 13.5°. However, within other embodiments of the invention the rotational offset may be determined by one or more factors including, but not limited to, the PTS, the VE, a VE-PTS scaling, and the user. Optionally, a calibration routine may be executed by the HMD upon initial use by a user to assess the maximum rotation angle etc. perceived or imperceptible to the user. This calibration routine may also establish other parameters of the rendering including, for example, the shape and/or size of the Foveal Zone, the shape and/or size of the Transition Zone, and the rendering within the Transition Zone (e.g. linear, constant, non-linear etc.).

Accordingly, for the two co-located cameras employed to render the foveal and non-foveal frames the color values are retrieved. The boundary values [0.0, 1.0] are also shown in FIG. 6. These coincide with the boundaries of the transition zone. The field-of-view $\delta_{TRANSITION}$ corresponding to the transition zone was defined empirically as an offset to the field-of-view of the foveal zone of +40°.

5B. Procedure

The premise of the inventor's invention is inattentional blindness which implies that the user's attention should be directed towards a cognitive task. Accordingly, the inventors instructed the participants to perform a target-retrieval task. More specifically, the participants were asked to search and count for red spheres hidden in the VE. At each iteration of the experiment, the red spheres were hidden at random locations. This was done in order to eliminate the possible bias that may be introduced by memorizing the locations between iterations.

The first user study involved 11 participants (2 females, 18.2%). Average age was 24.64 with a SD of 2.8. Median of their reported experiences with using VE devices was 3, and the median of their experiences with using an eye tracking device was also 3 on a 5-point Likert scale, with 1 being least familiar, and 5 being most familiar. The participants performed this task from a seated position and were only allowed to rotate their chair in-place. The participants were instructed to press the trigger button on the HMD controller if and when they noticed a visual distortion or felt nausea due to simulator sickness. During the experiment, the rotation angle of the non-foveal zone ($\theta$) was gradually increased and grouped by increasing order of the field-of-view $\delta$ of the foveal zone i.e. ([($\delta_1$, $\theta_1$), ($\delta_1$, $\theta_2$), ..., ($\delta_1$, $\theta_n$), ($\delta_2$, $\theta_1$), ..., ($\delta_2$, $\theta_n$), ... ]). Each time the trigger was pressed the ($\delta_i$, $\theta_i$) was recorded, and then the experiment continued with the now increased field of view $\delta_{i+1}$ and a reinitialized rotation angle $\theta_1$.

The range of values for the field-of-view assessed was 20° to 60°. The step of each increment was 10° after the completion of one cycle of the rotation angle, or until triggered by the user. During a cycle, the rotation angle ranged from 0° to 15° and the step of each increment was 1° per second.

Preliminary experiments during the design of the application had shown that repeated increments of the field-ofview of the foveal zone can lead to nausea and severe dizziness. For this reason, the participants were instructed to take a short break after each cycle of increments of the field-of-view. Furthermore, the sequence of the cycles i.e. the field-of-view values, was randomized for each participant in order to eliminate any bias. FIG. 6 shows the view from the user's perspective during the experiment.

5C. Analysis of Results

Figure 7:
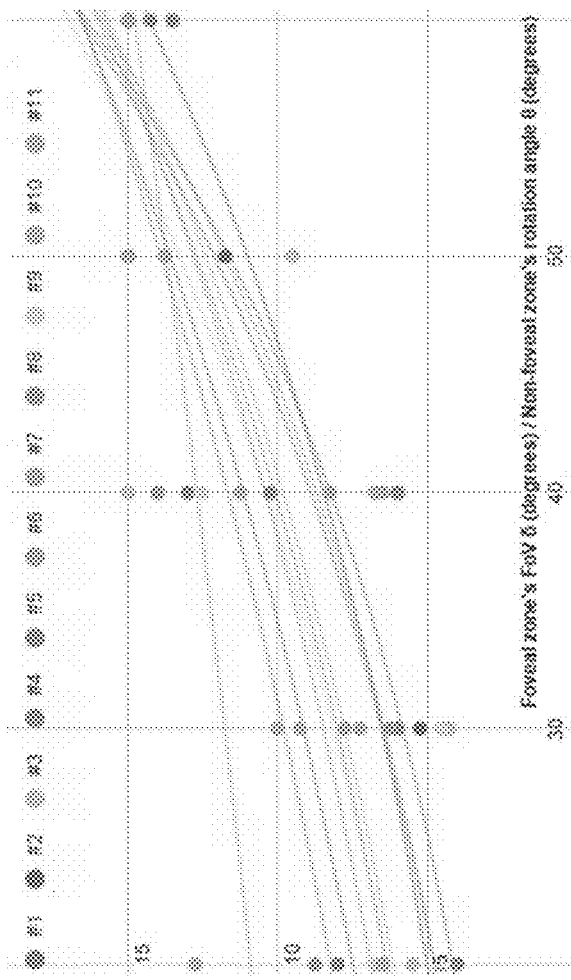
FIG. 7 depicts participant responses from the first user study employing VE rendered user perspectives such as depicted in FIG. 6.
Figure 8:
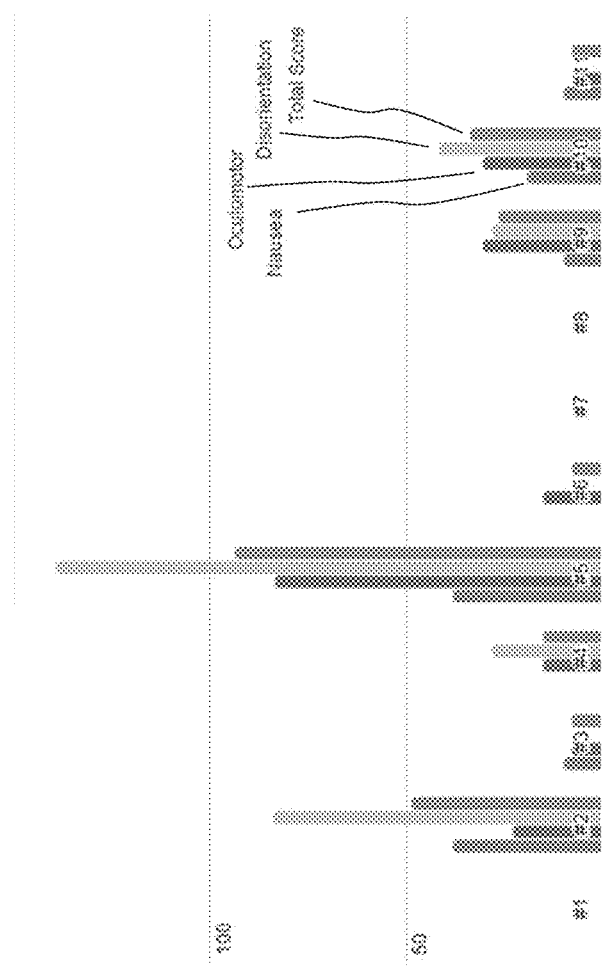
FIG. 8 depicts results of Simulation Sickness Questionnaire (SSQ) from the first user study employing VE rendered user perspectives such as depicted in FIG. 6 for determining maximum rotation angle and field-of-view of the foveal zone.
Figure 9:
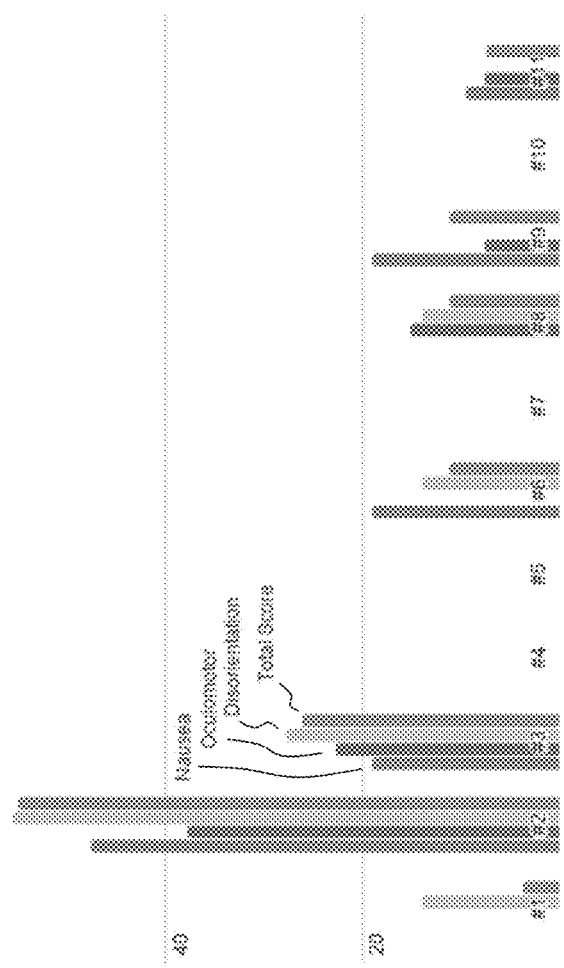
FIG. 9 depicts results of Simulation Sickness Questionnaire (SSQ) from a second user study with dynamic foveated rendering and parameters established from the first user study.

The results for the first study are shown in FIG. 7. A cycle of the rotation angle as performed for each field of view. The results show that as the field-of-view $\delta$ increases the tolerance for higher rotation angle also increases, which can also be confirmed by the exponential trendlines shown for each participant. For the reasons mentioned above, we select the smallest rotation angle for which users did not perceive a change associated with the largest field-of-view for which the majority of the users did not perceive a change (i.e. 9 out of 11). Thus, the ideal pair values for ($\delta$, $\theta$) was determined to be (60°, 13.5°); where 13:5° is the maximum allowed rotation angle.

5C.1. Simulator Sickness Questionnaire (SSQ)

Upon completing the experiment all participants were asked to complete Kennedy Lane's Simulation Sickness Questionnaire (SSQ). The Total Severity (TS) and the sub-scales Nausea, Oculomotor, and Disorientation were calculated using the formulas from Kennedy et al. in "Simulator Sickness Questionnaire: An Enhanced Method for Quantifying Simulator Sickness" (Int. J. Aviation Psychol. Vol 3, No. 2, pp 203-220; hereinafter Kennedy1). Based on the SSQ categorization provided by Kennedy et al. in "Configural Scoring of Simulator Sickness, Cybersickness and Space Adaptation Syndrome: Similarities and Differences" (Virtual and Adaptive Environments: Applications, Implications, and Human Performance Issues, Taylor and Francis, 2003, p. 247; hereinafter Kennedy2), 55% of the participants reported no signs (TS=0) or minimal signs (TS<10) of simulator sickness. All the participants completed the test, with 0 dropouts. Upon further analysis, the disorientation sub-scale had the highest average score of 29.11 with a maximum score of 139.2. This was expected, considering the fact that the rotation angle was constantly increasing and thus the VE rendered in the HMD induces conflicts between the vestibular and visual signals, leading to vestibular disturbances such as vertigo or dizziness. The results from SSQ responses are summarized in Table 1 and FIG. 8.

TABLE 1

Results from the responses of SSQ for User Study #1. The Total Severity (TS) and the corresponding sub-scales such as Nausea, Oculomotor, and Disorientation were calculated using the formulas of Kennedy1.

| Score | Mean | Median | Standard Deviation | Minimum | Maximum |
|---|---|---|---|---|---|
| Nausea (N) | 11.27 | 9.54 | 14.67 | 0 | 38.16 |
| Oculomotor (O) | 19.29 | 15.16 | 24.06 | 0 | 83.38 |
| Disorientation (D) | 29.11 | 0 | 45.09 | 0 | 139.2 |
| Total Score (TS) | 21.76 | 7.48 | 28.47 | 0 | 93.5 |

5D. Discussion

The design of the application of user study #1 involved making a decision on the range of values for (a) the field-of-view $\delta$, and (b) the rotation angle $\theta$ of the non-foveal zone.

Range of $\delta$

Humans have a maximum horizontal field-of-view of about 210°. This is further reduced to 110° by the HMD hardware i.e. maximum field-of-view for HTC VivePro.

Based upon the default parameters established by the inventors the foveal and non-foveal zones are complementary to each other. Thus, there is a tradeoff between the sizes of the foveal and non-foveal zones. If $\delta$ is large, then the foveal zone is large, and the non-foveal zone is small. Having a small non-foveal zone means that only a small area of the final composite image will be rendered from the non-foveal camera as shown in FIG. 5, leading to smaller possible redirections. When $\delta$=60° the foveal zone occupies 54.55% of the final composite render, based upon the defined parameters, HMD etc., and the non-foveal zone occupies 45.45% (including a transition zone of 35.45%). Similarly, if $\delta$=90° the foveal zone occupies 90.91% of the final composite render which does not leave much for the non-foveal zone. In contrast, if $\delta$ is small, then the foveal zone is small, and the non-foveal zone is large. Although this allows for larger redirections, the inventors found in their preliminary tests that when $\delta$<20° it can cause severe nausea and simulation sickness. For these reasons the inventors selected the range of values $\delta \in [20°, 60°]$ which balances the sizes of the foveal and non-foveal zones, and is large enough that it does not cause user discomfort.

Range of $\theta$

Recent upon experiments reported in the prior art it has been shown that users cannot tolerate a rotational angle of more than 12.6° in their field-of-view during a saccade having a velocity of 180°/sec. Based upon this the inventors selected the range $\theta \in [0°, 15°]$.

6. User Study 2 In-Situ Gaze Redirection Using Dynamic Foveated Rendering

The objectives of the second user study were twofold. Firstly, to determine whether a rotation of the VE by an angle below the maximum (i.e. $\theta$<13.5°) is indeed imperceptible and does not cause simulation sickness. Secondly, to experimentally prove with quantitative measures that using the proposed redirection technique with gaze-only (and without walking) the rotation of the VE results in the equivalent redirection of the participant in the PTS.

6A. Application and Procedure.

An experiment was devised similar to the one in Section 4. In contrast to the user study #1, the participants were only allowed to spin in-situ from a standing position. This change from a seated to a standing position eliminates the possibility of the participants perceiving any orientation and navigation cues coming from the orientation of the chair. The participants were given a target-retrieval task and instructed to retrieve, by directing their gaze to, as many virtual targets (i.e. orange pumpkins) as possible. The virtual targets disappeared as soon as the gaze direction intersected their bounding box. The positions of the targets were randomized for each participant.

The duration of the experiment was 60 seconds. Unbeknownst to the participants, in the first 30 seconds there was no redirection applied. This served as a baseline for participants who had little to no experience in using HMDs. Once accustomed to the VE, during the following 30 seconds the rotation angle of the VE was increased at a rate of 6°/s. Hence, the hypothesis is that after 30 seconds of a constant smooth rotation of the VE at a moderate rate of 6°/s the participant should face 180° away from their initial orientation, i.e. the opposite direction. To prove this, the initial (i.e. at time=0 s) and the final (i.e. at time=60 s) gaze directions of each participant were recorded. Additionally, before each participant removed the HMD at the end of the experiment they were asked to face towards what they believed to be their initial directions in the PTS using visual landmarks from within the VE to orient themselves.

6B. Analysis of Results

The study involved 11 participants with average age of 26.27±3.13. Based on a 5-point Likert scale the medians of their experience with using VE or any other eye tracking devices were 3. Five of the participants had not taken part in user study #1 (Participants #2, #3, #6, #9, #11). After the experiment, the participants completed the SSQ. The angle between the initial and final gaze directions was calculated for each participant. The average deviation was 171.26° (4.77 standard deviation) which means that the participants thought that their initial orientation was towards the opposite direction. In fact, all participants reported that they did not perceive the redirection and were surprised by how off their "sensed" orientations were.

6B.1. SSQ

Based on the scores reported by the participants in the post-test SSQ, the majority of the participants (55%) showed no signs (TS=0) or minimal signs (TS<10) of simulator sickness. The highest score and average were reported for the sub-scale disorientation although reduced by a factor of 2 from user study #1. This was anticipated since the rotation angle was less than the maximum determined from user study #1. As it can be seen from FIG. 9, one of the participants (#2) had no previous experience with VE and reported perceptual anomalies including difficulty concentrating, fullness of head and difficulty focusing. The results for the SSQ are summarized in Table 2.

TABLE 2

Results from the responses of SSQ for User Study #2.

| Score | Mean | Median | Standard Deviation | Minimum | Maximum |
|---|---|---|---|---|---|
| Nausea (N) | 10.41 | 0 | 15.06 | 0 | 47.7 |
| Oculomotor (O) | 8.27 | 0 | 12.43 | 0 | 37.9 |
| Disorientation (D) | 11.39 | 0 | 17.41 | 0 | 55.68 |
| Total Score (TS) | 11.22 | 7.48 | 15.78 | 0 | 52.36 |

7. User Study #3 Re-Directed Walking Using Dynamic Foveated Rendering

The objective of the third user study is to evaluate the efficacy of redirected walking during inattentional blindness using dynamic foveated rendering.

7A. Application

Figure 11:
FIG. 11 depicts an exemplary image from the game designed for the third user study.
Figures 12A, 12B, 12C:
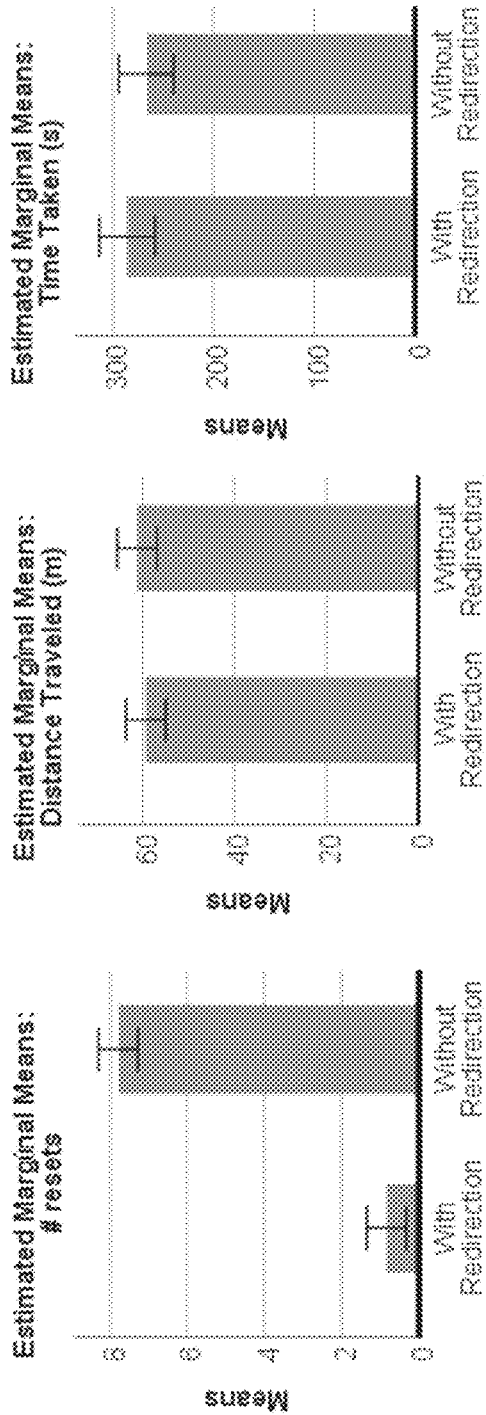
FIGS. 12A to 12C depict analysis of variable (ANOVA) results for number of resets, distance travelled in PTS, and total time taken.

As discussed above, inattentional blindness refers to the inability of an individual to see a salient object in plain sight due to lack of attention. This is true for the majority of the VE applications where the user is actively engaged and preoccupied with a cognitive task e.g. games, training simulations, etc. Thus, for the purposes of this user study, the inventors designed a first-person VE game where the objective is to stop an alien invasion. To achieve this the user has to walk through a deserted urban city to a predetermined location indicated by a large purple orb and destroy the alien-mothership (appearing in the form of a giant brain) while zapping green aliens along the way. Zapping one alien will award one score point to the player. The green alien enemies are randomly spawned (and are therefore independent of the orientation of the current redirection) only within the field-of-view of the user while also making a sound effect. An example of in-game gameplay is shown in FIG. 11.

The shortest distance the participants had to travel in the VE was 42 meters (approximately feet) while the available PTS had a size of 4×4 meters (approximately 13 feet by 13 feet). In the first to third user results depicted in FIGS. 10A to 10C respectively the PTS is depicted as a white colored square box and the position of the user with respect to the PTS is indicated with the camera icon in each instance. For safety reasons, a resetting mechanism of 2:1 was implemented. In cases where the game predicts that the user is about to cross over a boundary of the PTS, it would pause and prompt the user to rotate in-situ by 180°. During the user's rotation, the VE was also rotated by the same angle but in the opposite direction. The user was then allowed to proceed with playing the game.

Redirection was primarily performed by blending in real-time the foveal and non-foveal renders. Furthermore, redirection was also performed during the tracked naturally occurring blinks and saccades. In contrast to the prior art the methodology does not stimulate saccades nor blinks since these are disruptive to the cognitive task at hand.

7B. Procedure

In order to evaluate the efficacy of our technique, a controlled experiment was conducted where the independent variable being tested is the proposed redirection technique. The participants were instructed to complete the objective of the game twice; the first time with the experimental condition i.e. with redirected walking, and after a short break a second time with the control condition i.e. without redirected walking. For the experiment with the control condition, participants had to navigate themselves to the destination by relying solely on the resetting mechanism every time they went out-of-bounds from the available PTS.

A sample size estimation with an effect size of 0.25 showed that a total of 25 participants were required for the experiment. All the participants were randomly chosen (12% female, average age of 25.88 years with a standard deviation of 3.06). Based on a 5-point Likert Scale, the median of their experiences using VE headsets or any other eye tracking devices was 3.

Before the experiment, participants were briefed on their objective. Instructions were also given on how the resetting mechanism works in case they are prompted with an out-of-bounds warning and are required to reset their orientation. Moreover, they were instructed to walk at a normal pace which will allow them to complete the task along the way. Once both the objectives were completed, participants were also asked to complete the SSQ. Furthermore, for the experimental condition, at the end of the first experiment the participants were asked "Did you feel the redirection or any other scene or camera modulation during the experience?".

7C. Analysis of Results

A one-way between groups analysis of variable (ANOVA) ($\alpha$=0.05) with repeated measures was performed to compare the effects of with- and without-using the redirection on the dependent variables; (a) number of resets, (b) distance traveled in PTS, (c) total time taken, and (d) scores. The inventors used partial eta squared ($\eta_p^2$) to report the obtained effect sizes for each variable.

Based on the results of Levene's test, it was found that the outcomes for the number of resets ($F(2:14)$=375.710; $p>0.05$), distance traveled ($F(1:176)$=0:348; $p>0.05$) and total time taken ($F(0:971)$=1:001; $p>0.05$) were normally distributed and hence equal variances were assumed. However, the outcome for scores ($F(4:103)$=0.054; $p<0.05$) showed the opposite. As scores violated the homogeneity of variances assumption, the variable was omitted during the ANOVA analysis.

The results from ANOVA showed a statistically significant difference between the number of resets when the game was played with- and without-using the proposed redirection technique (F(1; 48)=375.710; p<0.001) with $\eta_p^2$=0.887. Nonetheless, these results also showed a statistically insignificant effect of redirection on distance traveled (F(1; 48)=0.384; p>0.05; $\eta_p^2$=0.008), and total time taken (F(1; 48)=1.001; p>0.05; $\eta_p^2$=0.020). The $\eta_p^2$ values shows that 88.7% of the variability in the required number of resets is accounted for by our independent variable i.e.—redirection. However, the effects on distance traveled and total time taken remains negligible. The results from this test can be seen in FIGS. 12A to 12C respectively for resets, distance travelled, and time taken respectively. The error bars in the graphs of Figurers 12A to 12C respectively show a confidence interval of 95%.

Figure 10A:
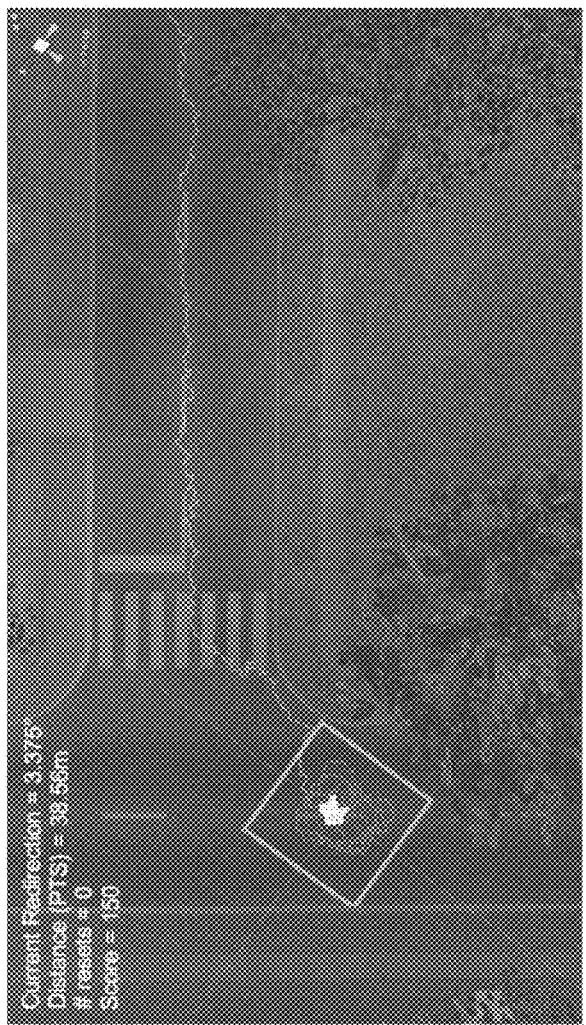
FIGS. 10A to 10C depict exemplary results of participants from a third user study showing the real world PTS and virtual environment path using inattentional blindness parameters as established by the inventors with dynamic foveated rendering.
Figure 10B:
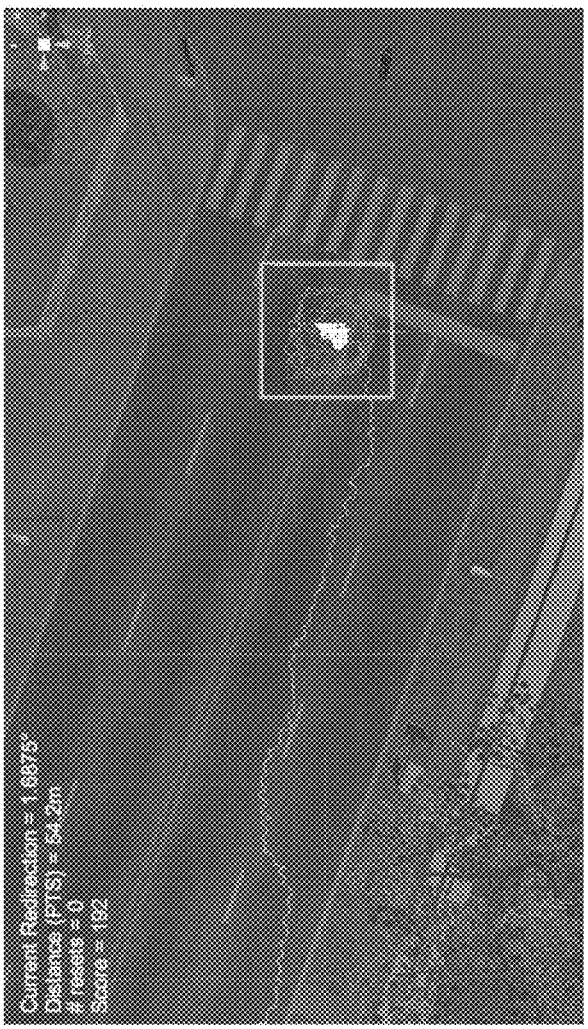
Figure 10C:
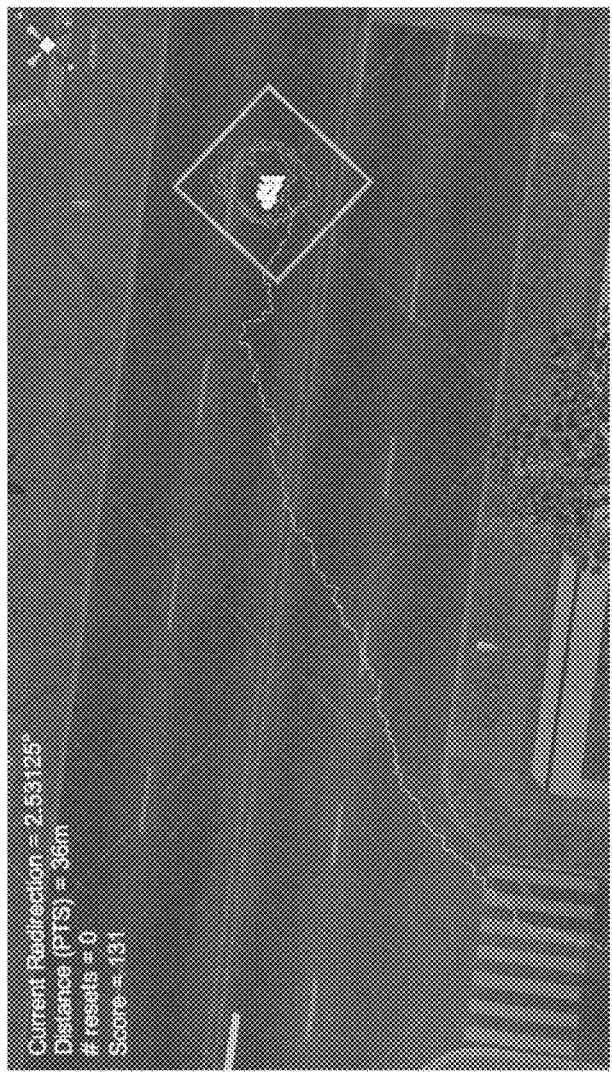

Referring to FIGS. 10A to 10C there are depicted VE and PTS paths for three users during the third study with:

FIG. 10A shows a distance of 38.56 meters (approximately 126.5 feet) without any resets representing a VE distance approximately 10 times the PTS dimension;

FIG. 10B shows a distance of 54.2 meters (approximately 178 feet) without any resets representing a VE distance approximately 14 times the PTS dimension; and FIG. 10C shows a distance of 36 meters (approximately 118 feet) without any reset representing a VE distance approximately 9 times the PTS dimension.

Besides this, results of the first experiment also showed that the system applied an average of 1547.55° (standard deviation 152.26°) of absolute angular gain to each participant's orientation during the entire test. An average of 3.15° of absolute angular gain was applied per redirection with an average of 1.73 redirections/s. As the participants were cognitively preoccupied with the task of zapping aliens, they were unaware of this angular gain.

Furthermore, since this is a real-time technique and thus the frames were rendered without additional lagging other than what is typically imposed by the hardware, none of the participants reported perceiving any scene nor camera manipulation. In the post-study questionnaire, one of the participant stated that "I felt like I was walking straight. I was completely unaware of my actual movements."

7C.1. SSQ

After completing the experiment, participants were asked to fill out an SSQ. Based on the scores reported, the majority of the participants (80%) showed no signs (TS=0) or minimal signs (TS<10) of simulator sickness, and only 8% of the participants reported TS>12. The highest score and mean were reported for the disorientation sub-scale even though the rotation angle was at all times well within the limits of tolerance as determined by user study #1. This can be attributed to the fact that the cognitive workload of the task involved in this user study was more demanding than in the previous user studies. Although this caused an increase in the highest score for disorientation, the mean decreased when compared to that of user study #2. The median values for all sub-scales, as before, were reported as 0. Table 3 summarizes the results from this SSQ. As it is evident, the mean scores were dropped significantly from user study #1 and #2.

TABLE 3

Results from the responses of SSQ for User Study #2.

| Score | Mean | Median | Standard Deviation | Minimum | Maximum |
|---|---|---|---|---|---|
| Nausea (N) | 2.29 | 0 | 5.7 | 0 | 19.08 |
| Oculomotor (O) | 6.67 | 7.58 | 9.1 | 0 | 37.9 |
| Disorientation (D) | 8.35 | 0 | 17.05 | 0 | 69.6 |
| Total Score (TS) | 6.43 | 3.74 | 10.04 | 0 | 44.88 |

8. Review

The results of the user study #3 are indicative of the efficacy of the proposed technique in VE applications where the cognitive workload on the user is moderate. Examples of such applications are immersive games, training simulations, cinematic VE, etc. Further to exploiting inattentional blindness, and unlike other state-of-the-art techniques, the inventor's innovative methodology relies only on naturally occurring saccades and blinks, and not stimulated saccades and blinks.

The inventive methodology is distinct from other reported work in the literature and an important advantage since stimulating saccades is both, disruptive to the cognitive task at hand and increases the effects of VE sickness. For example, within the prior art saccades have been stimulated by introducing orbs of light in image- and object-space to forcefully divert the user's attention in order to perform the redirection. In contrast to this, and based on the psychological effect of inattentional blindness, rather than divert the user's attention we exploit the fact that the user is fixated on a particular task leading to a "tunnel-vision"'-like focus. This allows the inventors to constantly update in real-time the non-foveal (peripheral) zone without the user perceiving a change. Metaphorically speaking, the foveal vision/zone acts as an update-brush of the framebuffer: whenever it moves, based on the tracking of the user's eyes, everything within the foveal zone is rendered without any rotations being applied, and everything outside i.e. the non-foveal zone, is rendered applied to the VE calculated in real-time based on the required redirection.

The experiment in user-study #3 used a PTS of 4×4 meters (approximately 13 feet square). The results show that even with a typical room-scale PTS such as the one used, the users were able to walk distances in the VE which were significantly larger. The longest distance recorded in experiments for this PTS 450 with prototype embodiments of the invention was 103.9 meters (approximately 341 feet) or 26 times the length or width of the PTS 450 or 18 times the diagonal of the PTS without a reset. Furthermore, the traveled distance can include long straight walks as shown in FIGS. 4A and 10A respectively.

Accordingly, the inventors have presented a rotation-based redirection technique using dynamic-foveated rendering which leverages the effect of inattentional blindness induced by a cognitive task. The technique uses natural visual suppressions such as eye blinks and saccades (without any artificial stimuli) to make subtle rotations to the VE without the user's knowledge. Furthermore, we conducted extensive tests and presented the results of three user studies. The results confirmed that the technique is indeed effective and can handle long-straight walks. This allows the users to freely explore open world VEs.

The embodiments of the invention presented above only use rotational gains for redirection. However, within other embodiments of the invention translational gains may be incorporated whilst maintaining the real-time performance.

Within other embodiments of the invention redirected walking systems may employ a saccade prediction algorithm(s).

Within other embodiments of the invention redirected walking systems may employ other forms of visual suppression e.g. phase of nystagmus, etc.

Within the embodiments of the invention the embodiments of the invention have been presented from the viewpoint of allowing a user to achieve a larger VE distance of travel than that of the PTS they are within. However, it would be evident that the redirection of motion according to embodiments of the invention may also be employed to redirect motion of a user within a PTS where the user is employing a HMD wherein the images rendered to the user are now not of a VE but their physical environment. These physical environment images may be processed to address visual defect(s) and/or vision degradation(s) of the user. Accordingly, a user with visual impairments wearing an HMD may thereby have their physical motion redirected to avoid their impacting elements within their physical environment. Accordingly, the HMD may through structured optical systems, lidar, sonar, radar, etc. establish a map of objects/surfaces etc. For example, such a redirected walking enhanced HMD may be used by the elderly with degraded vision to keep them mobile with reduced risk of injury/incident etc.

9. Minor Saccade Vision Suppression and Re-Directed Walking

Figure 13:
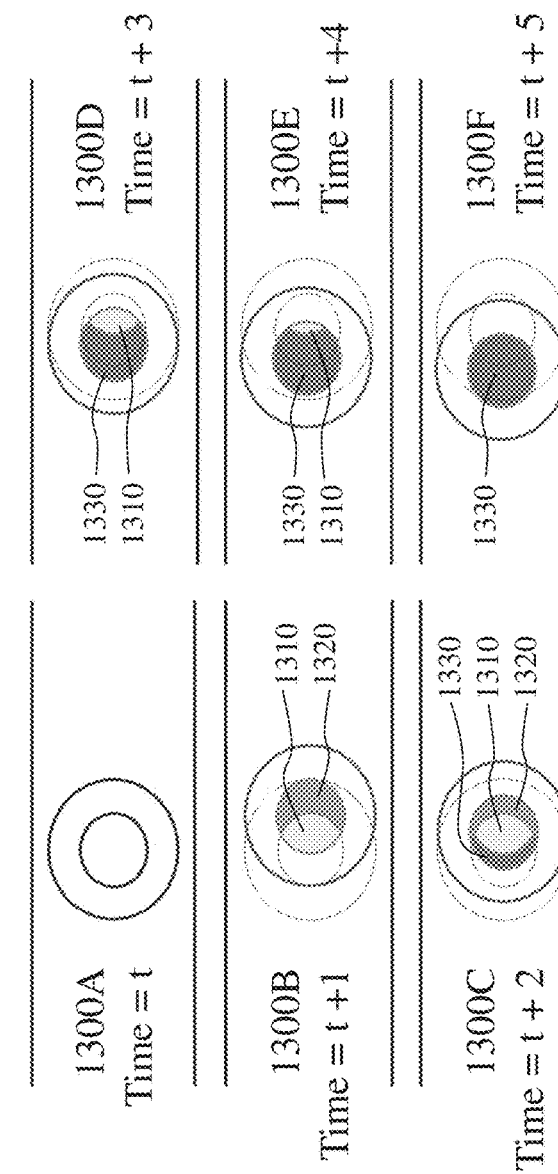
FIG. 13 depicts schematically exploiting minor saccades within embodiments of the invention.

Referring to FIG. 13 there are depicted first to sixth images 1300A to 1300F respectively to a process of redirected walking based upon executing a series of renderings that exploit minor saccades to sequentially shift the foveal region presented to a user such that they redirect their walking as a result. Referring to these then first image 1300A depicts concentric circles referring to the foveal and transitional zones respectively at time "t" whereas the shaded concentric circles in second to sixth image 1300B to 1300F respectively depict the foveal and transition zones at times "'t+n" (where n=n+1 after the detection of each minor saccade). The First Region 1310 depicts in each sequential minor saccades the foveal region which is to be replaced, Second Region 1320 the transition region which is to be replaced and the Third Region 1330 shows the replaced foveal region to new straight. Accordingly, as depicted by the 6th step (time=t+5), the entire initial foveal region (time=t) is replaced and is now aligned with the new straight. Accordingly, the process is repeated for each detected minor saccade so that every $5^{th}$ minor saccade the initial foveal region is replaced. If a major saccade is detected in the middle of this process then a regular redirection algorithm is followed and the entire foveal region is directly replaced with the new straight. Whilst the process described and depicted with respect to FIG. 13 is depicted as being performed in 6 steps, i.e. N=6, or 5 minor saccades it would be evident that other number of steps, N, or N−1 minor saccades may be employed, such as for example N=3, 4 or any positive integer. Repainting the foveal region may take any number of steps. Basically, when a minor saccade is detected the area of the new foveal region which was not part of the original foveal region is replaced with the new image from the new foveal region. The intersection of the new and old foveal region remains the same, i.e. the image from the old foveal region. This step is repeated for each following minor saccade until the entire old foveal region is replaced with the foveal region of the new straight (redirected).

Figure 14:
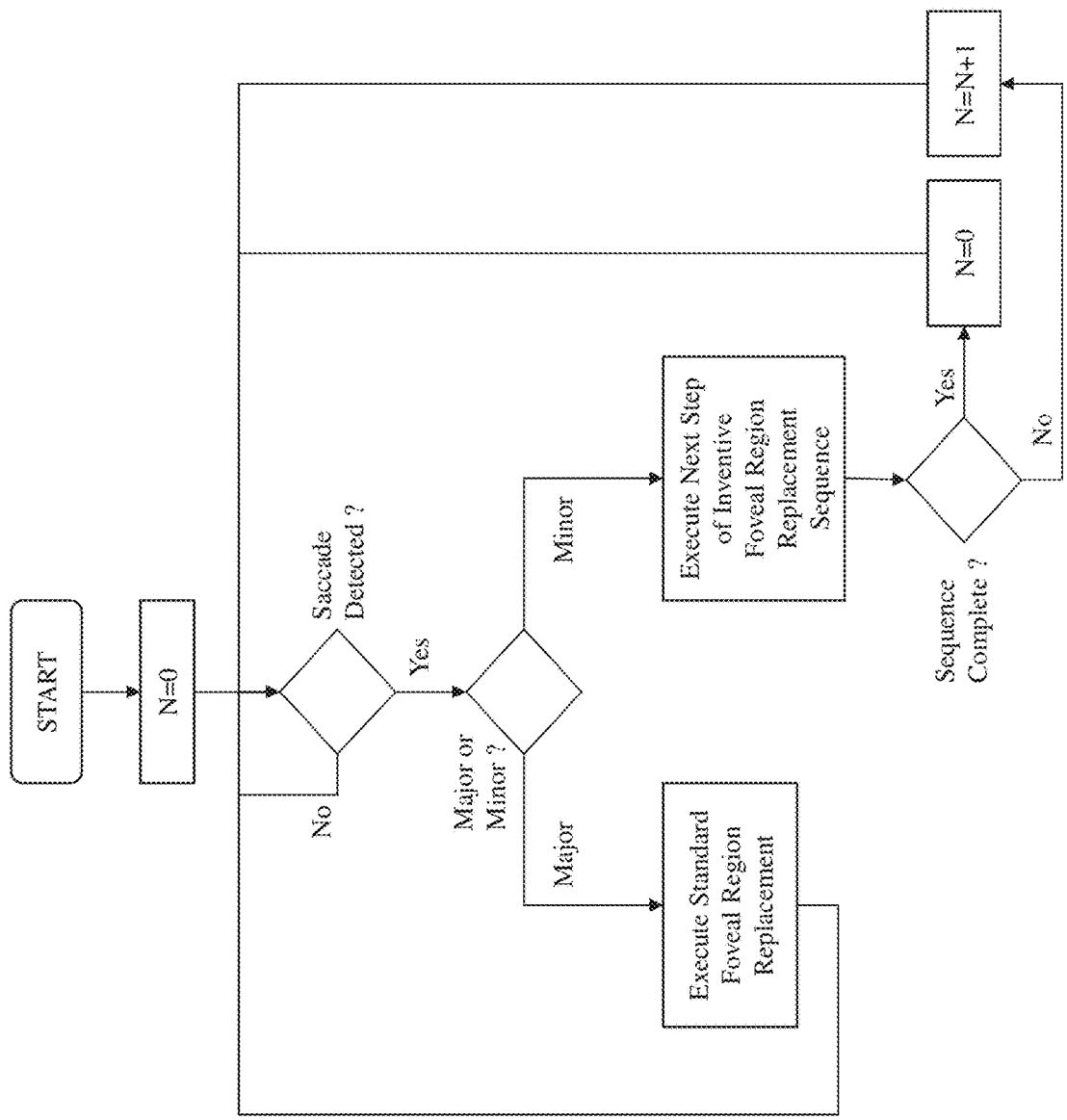
FIG. 14 depicts a flowchart illustrating a process based upon an embodiment of the invention.

Accordingly, based upon an embodiment of the invention a process such as that depicted in FIG. 14 may be executed. This executes such that:

1. User is oriented to original straight ahead.
2. Periphery moves to new straight ahead.
3. Minor saccade is detected and the eye moves to location x (Foveal region X). (Current foveal region can be a blend of any of these 3 regions: original foveal region, original transition region and the new straight periphery)
4. Minor saccade is detected and the eye moves to location y (Foveal region Y). (In foveal region Y, Y−X is now replaced with new straight foveal region and Y∩X remains as it is)

Step 4 is repeated until the entire original foveal region is painted with the new straight.

Accordingly, after this process the user's body is reoriented to new straight ahead so that the user's body orients from the original straight ahead to the new physical orientation by the redirection. If, during this process a major saccade is detected then a regular redirection algorithm is employed such that the entire foveal region is directly replaced with the new straight. Based upon the measurements performed by the inventors on test users it takes an average of 2.2 second to complete this cycle which is rarely noticed by the user due to the inattentional blindness induced by the cognitive task at hand within the VE. The onset of each minor saccade or major saccade being determined from the signal(s) acquired from an eye-tracker forming part of the HMD worn by the user.

Within the embodiments of the invention described and depicted above the process has been described and depicted with respect to images from two cameras although it would be evident that these are "virtual" cameras, the first representing the VE field of view as viewed by the user in their foveal region and the other representing the VE field of view as viewed by the user if they had turned by a predetermined rotational angle. This second VE field of view is rendered in the peripheral vision of the user whilst a transition region is generated to "blend" between the first and second field of views so that user is not aware of the boundary between them.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method of redirecting motion of a user comprising:
   rendering to the user a sequence of images relating
      wherein each image comprises:
         a foveal region representing a predetermined portion of
            a first field of view of the user at a current location of the user with a first direction having a first predetermined geometry and first predetermined dimensions;

a non-foveal region representing a predetermined portion of a second field of view of the user at the current location with a second direction having a second predetermined geometry and second predetermined dimensions; and a transition region having a predetermined third predetermined geometry and third predetermined dimensions; wherein in a first image of the sequence of images the first direction and second direction are the same;

in a second image of the sequence of images the second direction is offset relative to the first direction by a predetermined angular offset;

in a third image of the sequence of images the first direction is set to the second direction in the second image of the sequence of images such that the first direction and second direction are the same but are now offset from the original first direction in the first image of the sequence of images by the predetermined angular offset;

the transition region blends from the foveal region to the non-foveal region according to a predetermined function; and transitioning from the first image of the sequence of images to the second image of the sequence of images and the second image of the sequence of images to the third image of the sequence of images is established in dependence upon determining a predetermined natural event with respect to an eye of the user.

2. The method according to claim 1, wherein
the predetermined natural event is a minor saccade, a major saccade or a blink.

3. The method according to claim 1, wherein
the method is performed based upon natural events with respect to the eye of the user and independent of any induced saccade.

4. The method according to claim 1, wherein
the determination of the predetermined event with respect to the eye of the user is determined in dependence upon signals from an eye tracker associated with the eye of the user.

5. The method according to claim 1, wherein
the sequence of images result in physical motion of the user being redirected from the first direction to the second direction.

6. The method according to claim 1, wherein
the field of view is one of a virtual environment, a physical real world environment of the user, the physical real world environment of the user augmented with additional digital content, and the physical real world environment of the user augmented with another virtual environment.

7. A method of redirecting motion of a user comprising:
rendering to the user a sequence of images relating wherein each image comprises:
a foveal region having a first predetermined geometry and first predetermined dimensions;
a non-foveal region having a second predetermined geometry and second predetermined dimensions; and
a transition region having a predetermined third predetermined geometry and third predetermined dimensions; wherein in a first image of the sequence of images the foveal region is a first predetermined portion of a first field of view of the user at a current location of the user with a first direction;

in a last image of the sequence of images the foveal region is a first predetermined portion of a second field of view of the user at a current location of the user with a second direction;

the non-foveal region in each image of the sequence of images is a predetermined portion of a second field of view of the user at the current location with the second direction;

the second direction is offset from the first direction by a predetermined amount;

in each subsequent image of the sequence of images between the first image of the sequence of images and the second image of the sequence of images the foveal region comprises:
a first predetermined foveal portion comprising a first predetermined portion of the first field of view of the user at the current location of the user with the first direction; and
a second predetermined foveal portion comprising a first predetermined portion of the second field of view of the user at the current location of the user with the second direction.

8. The method according to claim 7, further comprising
determining a natural minor saccade with respect to an eye of the user;
rendering the next image of the sequence of images to the user.

9. The method according to claim 7, wherein
the rendering each image of the sequence of images is triggered by determining a natural minor saccade with respect of an eye of the user and independent of any induced minor saccade or major saccade.

10. The method according to claim 7, wherein
physical motion of the user is redirected from the first direction to the second direction in dependence upon their viewing the sequence of images.

11. The method according to claim 7, wherein
the field of view is one of a virtual environment, a physical real world environment of the user, the physical real world environment of the user augmented with additional digital content, and the physical real world environment of the user augmented with another virtual environment.

12. A method of redirecting motion of a user comprising:
a) determining a requirement to redirect the motion of the user from a current direction to a target direction;
b) determining an occurrence of an event with respect to an eye of the user;
c) determining whether the event is a minor saccade, a major saccade, or a blink;
d) upon determination of a minor saccade executing a next step of a first process which redirects the motion of the user from the current direction to the target direction in a number of steps;
e) upon determination of a major saccade or a blink executing a second process which redirects the motion of the user from the current direction to the target direction in a single step;
f) repeating steps (b) to (f) until motion of the user has been redirected to the target direction: wherein
the first process comprises rendering to the user a sequence of images relating wherein each image comprises:

a foveal region having a first predetermined geometry and first predetermined dimensions;

a non-foveal region having a second predetermined geometry and second predetermined dimensions; and a transition region having a predetermined third predetermined geometry and third predetermined dimensions; wherein in a first image of the sequence of images the foveal region is a first predetermined portion of a first field of view of the user at a current location of the user with a current direction;

in a last image of the sequence of images the foveal region is a first predetermined portion of a second field of view of the user at a current location of the user with a target direction;

the non-foveal region in each image of the sequence of images is a predetermined portion of a second field of view of the user at the current location with the target direction;

the second direction is offset from the first direction by a predetermined amount;

in each subsequent image of the sequence of images between the first image of the sequence of images and the second image of the sequence of images the foveal region comprises:
  a first predetermined foveal portion comprising a first predetermined portion of the first field of view of the user at the current location of the user with the current direction; and
  a second predetermined foveal portion comprising a first predetermined portion of the second field of view of the user at the current location of the user with the target direction.

13. The method according to claim 12, wherein in the second process a current image rendered to the user relating to a field of view from a current location in the current direction is replaced with a new image which is rendered to the user relating to a new field of view from the current location in the target direction.

14. A method of redirecting motion of a user comprising:
a) determining a requirement to redirect the motion of the user from a current direction to a target direction;
b) determining an occurrence of an event with respect to an eye of the user;
c) determining whether the event is a minor saccade, a major saccade, or a blink;
d) upon determination of a minor saccade executing a next step of a first process which redirects the motion of the user from the current direction to the target direction in a number of steps;
e) upon determination of a major saccade or a blink executing a second process which redirects the motion of the user from the current direction to the target direction in a single step;
f) repeating steps (b) to (f) until motion of the user has been redirected to the target direction; wherein the first process comprises rendering to the user a sequence of images relating wherein each image comprises:
  a foveal region having a first predetermined geometry and second predetermined dimensions;
  a non-foveal region having a second predetermined geometry and second predetermined dimensions; and
  a transition region having a predetermined third predetermined geometry and third predetermined dimensions; wherein in a first image of the sequence of images the foveal region is a first predetermined portion of a first field of view of the user at a current location of the user with a first direction;

in a last image of the sequence of images the foveal region is a first predetermined portion of a second field of view of the user at a current location of the user with a second direction;

the non-foveal region in each image of the sequence of images is a predetermined portion of a second field of view of the user at the current location with the second direction;

the second direction is offset from the first direction by a predetermined amount;

in each subsequent image of the sequence of images between the first image of the sequence of images and the second image of the sequence of images the foveal region comprises:
  a first predetermined foveal portion comprising a first predetermined portion of the first field of view of the user at the current location of the user with the first direction; and
  a second predetermined foveal portion comprising a first predetermined portion of the second field of view of the user at the current location of the user with the second direction.

\* \* \* \* \*